US012334083B2

(12) United States Patent
Beack et al.

(10) Patent No.: US 12,334,083 B2
(45) Date of Patent: Jun. 17, 2025

(54) APPARATUS AND METHOD FOR AUDIO ENCODING/DECODING ROBUST TO TRANSITION SEGMENT ENCODING DISTORTION

(71) Applicant: ELECTRONICS AND TELECOMMUNICATIONS RESEARCH INSTITUTE, Daejeon (KR)

(72) Inventors: Seung Kwon Beack, Daejeon (KR); Jongmo Sung, Daejeon (KR); Mi Suk Lee, Daejeon (KR); Tae Jin Lee, Daejeon (KR); Woo-taek Lim, Daejeon (KR); Inseon Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 274 days.

(21) Appl. No.: 18/014,924

(22) PCT Filed: Jul. 2, 2021

(86) PCT No.: PCT/KR2021/008417
§ 371 (c)(1),
(2) Date: Jan. 6, 2023

(87) PCT Pub. No.: WO2022/010189
PCT Pub. Date: Jan. 13, 2022

(65) Prior Publication Data

US 2024/0087577 A1 Mar. 14, 2024

(30) Foreign Application Priority Data

Jul. 6, 2020 (KR) ........................ 10-2020-0083086
Dec. 29, 2020 (KR) ........................ 10-2020-0186628

(51) Int. Cl.
*G10L 19/005* (2013.01)
*G10L 19/16* (2013.01)

(52) U.S. Cl.
CPC .......... *G10L 19/005* (2013.01); *G10L 19/167* (2013.01)

(58) Field of Classification Search
None
See application file for complete search history.

(56) References Cited

U.S. PATENT DOCUMENTS

| | | | |
|---|---|---|---|
| 9,711,150 | B2 | 7/2017 | Beack et al. |
| 10,332,535 | B2 | 6/2019 | Disch et al. |

(Continued)

FOREIGN PATENT DOCUMENTS

| | | |
|---|---|---|
| JP | 9-152895 | 6/1997 |
| JP | 6643285 | 2/2020 |

(Continued)

OTHER PUBLICATIONS

Written Opinion, with English translation, for International Application No. PCT/KR2021/008417, dated Oct. 12, 2021.

(Continued)

*Primary Examiner* — Hemant S Patel
(74) *Attorney, Agent, or Firm* — KILE PARK REED & HOUTTEMAN PLLC

(57) ABSTRACT

Disclosed is an apparatus and method for audio encoding/decoding that is robust against coding distortion in a transition section. An audio encoding method includes outputting a frequency domain signal by time-to-frequency (T/F) transform of an input signal, outputting a frequency domain residual signal in which a frequency axis envelope is removed from the frequency domain signal by applying frequency domain noise shaping (FDNS) encoding to the frequency domain signal, outputting a time domain residual (Continued)

signal in which a time axis envelope is removed by performing linear prediction coefficient (LPC) analysis based on the frequency domain residual signal, and quantizing and transmitting the time domain residual signal.

11 Claims, 20 Drawing Sheets

(56) References Cited

U.S. PATENT DOCUMENTS

| | | | | |
|---|---|---|---|---|
| 2012/0245947 | A1 * | 9/2012 | Neuendorf | G10L 19/20<br>704/500 |
| 2012/0271644 | A1 * | 10/2012 | Bessette | G10L 19/03<br>704/E19.035 |
| 2020/0243099 | A1 | 7/2020 | Beack et al. | |

FOREIGN PATENT DOCUMENTS

| | | |
|---|---|---|
| KR | 10-1998-0042556 | 8/1998 |
| KR | 10-2006-0131766 | 12/2006 |
| KR | 10-2007-0008411 | 1/2007 |
| KR | 10-2010-0063639 | 6/2010 |

OTHER PUBLICATIONS

Neuendorf et al., "MPEG Unified Speech and Audio Coding—The ISO/MPEG Standard for High-Efficiency Audio Coding of all Content Types", Audio Engineering Society Convention Paper 8654, Apr. 2012, pp. 1-22.

International Search Report, corresponding to International Application No. PCT/KR2021/008417, dated Oct. 12, 2021.

* cited by examiner

APPARATUS AND METHOD FOR AUDIO ENCODING/DECODING ROBUST TO TRANSITION SEGMENT ENCODING DISTORTION

TECHNICAL FIELD

The present disclosure relates to an audio encoding/decoding apparatus and method, and more particularly, to an apparatus and method relating to an audio encoding/decoding technique that is robust against coding distortion in a transition section.

BACKGROUND ART

The occurrence of a transition section in an audio encoding process may cause a decrease in encoding efficiency and sound quality distortion. For example, encoding a section in which sounds of two instruments transition or overlap in a situation where a piano and a guitar are played at the same time requires various encoding schemes to be applied and consumes a lot of bits.

When a transition section occurs, a conventional audio encoding method partially suppresses the transition section by varying the length of a unit frame to be analyzed or applying temporal noise shaping technique, which, however, still requires high bit consumption and causes sound quality distortion.

Accordingly, there is a need for a method of minimizing a reduction in encoding efficiency and a loss of sound quality caused by the occurrence of a transition section.

DISCLOSURE OF THE INVENTION

Technical Goals

The present disclosure provides an apparatus and method for increasing an encoding efficiency and minimizing a loss of sound quality by performing encoding by operating in the same framework without exception handling even when a transition section occurs.

Technical Solutions

According to an aspect, there is provided an audio encoding method including outputting a frequency domain signal by time-to-frequency (T/F) transform of an input signal, outputting a frequency domain residual signal in which a frequency axis envelope is removed from the frequency domain signal by applying frequency domain noise shaping (FDNS) encoding to the frequency domain signal, outputting a time domain residual signal in which a time axis envelope is removed by performing linear prediction coefficient (LPC) analysis based on the frequency domain residual signal, and quantizing and transmitting the time domain residual signal.

The outputting of the frequency domain residual signal may include obtaining LPC information from the input signal, obtaining frequency axis envelope information from the LPC information, and generating the frequency domain residual signal by removing the frequency axis envelope information from the frequency domain signal.

The outputting of the frequency domain residual signal may further include transforming the LPC information into LPC frequency information in a frequency domain, and the obtaining of the envelope information may include obtaining an absolute value of the LPC frequency information as the envelope information.

The outputting of the time domain residual signal may include obtaining an LPC from the frequency domain residual signal, and outputting a time domain residual signal in which frequency axis envelope information and time axis envelope information is removed by LPC analysis of the frequency domain residual signal using the LPC.

According to an aspect, there is provided an audio decoding method including outputting a time domain residual signal by dequantizing a received signal, outputting a frequency domain residual signal by LPC analysis of the time domain residual signal, outputting a frequency domain signal by performing FDNS decoding on the frequency domain residual signal, outputting a time domain signal by frequency-to-time (F/T) transform of the frequency domain signal, and restoring an input signal by performing time domain aliasing cancellation (TDAC) on the time domain signal.

The received signal may include at least one of LPC information extracted from an input signal input to an audio encoding apparatus, an LPC obtained from a frequency domain residual signal of the input signal, and a bitstream to which a time domain residual signal of the input signal is transformed after quantized, and the outputting of the time domain residual signal may include restoring the time domain residual signal by dequantizing the bitstream.

The outputting of the frequency domain residual signal may include outputting the frequency domain residual signal in which time axis envelope information is restored by LPC synthesis of the time domain residual signal using the LPC included in the received signal.

The outputting of the frequency domain signal may include obtaining frequency axis envelope information from LPC frequency information included in the received signal, and outputting the frequency domain signal by restoring the frequency axis envelope information in the frequency domain residual signal.

According to an aspect, there is provided an audio encoding method including outputting a frequency domain signal by T/F transform of an input signal, outputting a frequency domain residual signal in which a frequency axis envelope is removed from the input signal by applying FDNS encoding to the frequency domain signal, outputting a time domain signal by F/T transform of the frequency domain residual signal, applying TDAC to the time domain signal, outputting a time domain residual signal in which a time axis envelope is removed by temporal noise shaping (TNS)-2 encoding of the time domain signal to which TDAC is applied, and quantizing and transmitting the time domain residual signal.

The outputting of the time domain residual signal may include transforming the time domain signal to which TDAC is applied into an analytic form by Hilbert transform, obtaining a complex LPC by performing discrete Fourier transform (DFT) on the analytic form, obtaining time axis envelope information by applying inverse DFT (IDFT) and an absolute value (ABS) operation to the complex LPC, and obtaining the time domain residual signal by removing the time axis envelope information from the time domain signal to which TDAC is applied.

The outputting of the time domain residual signal may include transforming the time domain signal to which TDAC is applied into an analytic form by Hilbert transform, obtaining a complex LPC by performing DFT on the analytic form, outputting a second frequency domain residual signal by performing DFT on the time domain signal to which TDAC is applied, removing time axis envelope information by LPC analysis of the second frequency domain residual signal using the complex LPC, and obtaining the time domain residual signal by applying IDFT to the second frequency domain residual signal in which the time axis envelope information is removed.

According to an aspect, there is provided an audio decoding method including outputting a time domain residual signal by dequantizing a received signal, outputting a time domain signal by TNS-2 decoding of the time domain residual signal, outputting a frequency domain residual signal by T/F transform of the time domain signal, outputting a frequency domain signal by performing FDNS decoding on the frequency domain residual signal, outputting a second time domain signal by F/T transform of the frequency domain signal, and restoring an input signal by performing TDAC on the second time domain signal.

The received signal may include at least one of LPC information extracted from an input signal input to an audio encoding apparatus, a complex LPC obtained from a time domain signal of the input signal, and a bitstream to which a time domain residual signal of the input signal is transformed after quantized, and the outputting of the time domain residual signal may include restoring the time domain residual signal by dequantizing the bitstream.

The outputting of the time domain signal may include obtaining time axis envelope information by applying IDFT and an ABS operation to the complex LPC, and outputting the time domain signal by restoring the time axis envelope information in the time domain residual signal.

The outputting of the time domain signal may include outputting a second frequency domain residual signal by performing DFT on the time domain residual signal, restoring time axis envelope information by LPC analysis of the second frequency domain residual signal using the complex LPC, and obtaining the time domain signal by applying IDFT to the second frequency domain residual signal in which the time axis envelope information is restored.

According to an aspect, there is provided an audio encoding method including outputting a time domain signal in which a frequency axis envelope is removed by LPC analysis of an input signal, outputting a time domain residual signal in which a time axis envelope is removed by TNS-2 encoding of the time domain signal, and quantizing and transmitting the time domain residual signal.

The outputting of the time domain residual signal may include transforming the time domain signal into an analytic form by Hilbert transform, obtaining a complex LPC by performing DFT on the analytic form, obtaining time axis envelope information by applying IDFT and an ABS operation to the complex LPC, and obtaining the time domain residual signal by removing the time axis envelope information from the time domain signal.

According to an aspect, there is provided an audio decoding method including outputting a time domain residual signal by dequantizing a received signal, outputting a time domain signal by TNS-2 decoding of the time domain residual signal, and restoring an input signal by synthesizing the time domain signal with LPC information received from an audio encoding apparatus.

The received signal may include at least one of LPC information extracted from an input signal input to an audio encoding apparatus, a complex LPC obtained from a time domain signal of the input signal, and a bitstream to which a time domain residual signal of the input signal is transformed after quantized, and the outputting of the time domain residual signal may include restoring the time domain residual signal by dequantizing the bitstream.

The outputting of the time domain signal may include obtaining time axis envelope information by applying IDFT and an ABS operation to the complex LPC, and outputting the time domain signal by restoring the time axis envelope information in the time domain residual signal.

EFFECTS

According to an example embodiment of the present disclosure, an encoding efficiency may be increased by applying a temporal noise shaping (TNS) technique that smooths time axis information in a frequency domain residual signal output by applying frequency domain noise shaping (FDNS) encoding.

In addition, according to an example embodiment of the present disclosure, the encoding efficiency may be improved by transforming a frequency domain residual signal in which a frequency envelope is removed into a time domain signal and then removing a time axis envelope by TNS-2 encoding.

Further, the encoding efficiency may be improved by removing the frequency envelope by performing linear prediction coefficient (LPC) analysis, transforming the frequency domain residual signal in which the frequency envelope is removed into the time domain signal, and then removing the time axis envelope by TNS-2 encoding.

BEST MODE FOR CARRYING OUT THE INVENTION

Figure 1:
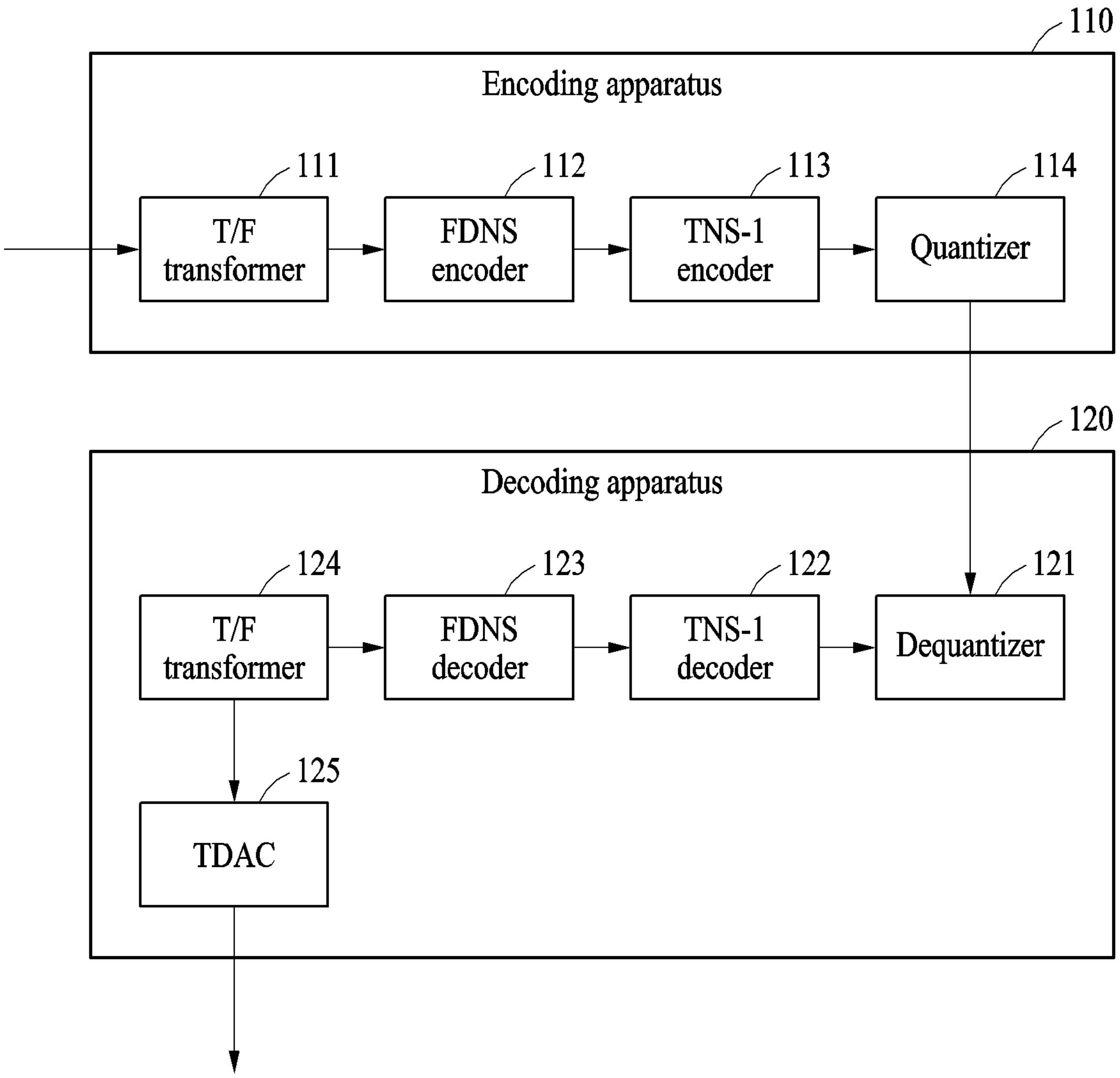
FIG. 1 illustrates audio encoding/decoding apparatuses according to a first example embodiment of the present disclosure.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Hereinafter, example embodiments will be described in detail with reference to the accompanying drawings.

For example, linear prediction coefficient (LPC) analysis used in an example embodiment of the present disclosure may be performed using Equation 1.

$$r(n) = x(n) - \sum_{k=1}^{p} a_k x(n-k) \quad \text{[Equation 1]}$$

In addition, LPC synthesis used in an example embodiment of the present disclosure may be performed using Equation 1.

$$x(n) = \sum_{k=1}^{p} a_k x(n-k) + r(n) \quad \text{[Equation 2]}$$

Here, an LPC is $\alpha_k$ of a p order, and may be quantized and applied.

FIG. 1 illustrates audio encoding/decoding apparatuses according to a first example embodiment of the present disclosure.

An audio encoding apparatus 110 may include a time-to-frequency (T/F) transformer 111, a frequency domain noise shaping (FDNS) encoder 112, a temporal noise shaping (TNS)-1 encoder 113, and a quantizer 114, as shown in FIG. 1. At this time, the T/F transformer 111, the FDNS encoder 112, the TNS-1 encoder 113, and the quantizer 114 may be different processors, or separate modules included in a program executed by one processor. For example, the audio encoding apparatus 110 may be an encoder.

The T/F transformer 111 may output a frequency domain signal by T/F transform of an input signal. For example, the T/F transformer 111 may perform T/F transform of the input signal into the frequency domain signal using modified discrete cosine transform (MDCT). In addition, the input signal x(b) is a block unit vector, and may be defined as in Equation 3.

$$x(b)=[x(n-M+1), \ldots, x(n)]^T \quad \text{[Equation 3]}$$

The FDNS encoder 112 may output a frequency domain residual signal by applying FDNS encoding to the frequency domain signal output from the T/F transformer 111. In this case, the frequency domain residual signal may be a signal in which a frequency axis envelope is removed from the frequency domain signal.

The TNS-1 encoder 113 may output a time domain residual signal in which a time axis envelope is removed by performing LPC analysis based on the frequency domain residual signal output from the FDNS encoder 112. In this case, the TNS-1 encoder 113 may use a TNS-1 encoding technique that predicts an LPC in a frequency domain and generates a residual signal according to a prediction result. Also, according to an example embodiment, the audio encoding apparatus 110 may encode the frequency domain residual signal using another encoder that performs LPC analysis.

The audio encoding apparatus 110 may apply a TNS technique that smooths time axis information in a frequency domain residual signal output by applying FDNS encoding, thereby increasing encoding efficiency.

The quantizer 114 may quantize the time domain residual signal output from the TNS-1 encoder 113, then transform the quantized time domain residual signal into a bitstream, and transmit the transformed time domain residual signal to an audio decoding apparatus 120.

The detailed configuration and operation of the audio encoding apparatus 110 will be described in detail below with reference to FIG. 3.

The audio decoding apparatus 120 may include a dequantizer 121, a TNS-1 decoder 122, an FDNS decoder 123, a frequency-to-time (F/T) transformer 124, and a time domain aliasing cancellation (TDAC) 125, as shown in FIG. 1. At this time, the dequantizer 121, the TNS-1 decoder 122, the FDNS decoder 123, the F/T transformer 124, and the TDAC 125 may be different processors, or separate modules included in a program executed by one processor.

The dequantizer 121 may output a time domain residual signal by dequantizing a received signal that is received from the audio encoding apparatus 110.

In this case, the received signal may include at least one of LPC information extracted from the input signal input to the audio encoding apparatus 110, an LPC obtained from the frequency domain residual signal of the input signal, and the bitstream to which the time domain residual signal of the input signal is transformed after quantized. In addition, the dequantizer 121 may restore the time domain residual signal by dequantizing the bitstream.

The TNS-1 decoder 122 may output a frequency domain residual signal by LPC analysis of the time domain residual signal output from the dequantizer 121. In this case, the TNS-1 decoder 122 may decode the time domain residual signal using a TNS-1 decoding technique. Also, according to an example embodiment, the audio decoding apparatus 120 may decode the frequency domain residual signal using another decoder that performs LPC analysis.

The FDNS decoder 123 may output a frequency domain signal by performing FDNS decoding on the frequency domain residual signal output from the TNS-1 decoder 122.

The F/T transformer 124 may output a time domain signal by F/T transform of the frequency domain signal output from the FDNS decoder 123. For example, the F/T transformer 124 may perform F/T transform of the frequency domain signal into the time domain signal using inverse modified discrete cosine transform (IMDCT).

The TDAC 125 may restore the input signal by performing TDAC on the time domain signal output from the F/T transformer 124. In this case, the TDAC 125 may be an element that performs TDAC to remove time domain aliasing generated by MDCT characteristics.

Accordingly, when the F/T transformer 124 is a transformer that does not generate time domain aliasing, the audio decoding apparatus 120 may not include the TDAC 125, and the F/T transformer 124 may restore the input signal by F/T transform of the frequency domain signal.

The detailed configuration and operation of the audio decoding apparatus 120 will be described in detail below with reference to FIG. 3.

Figure 2:
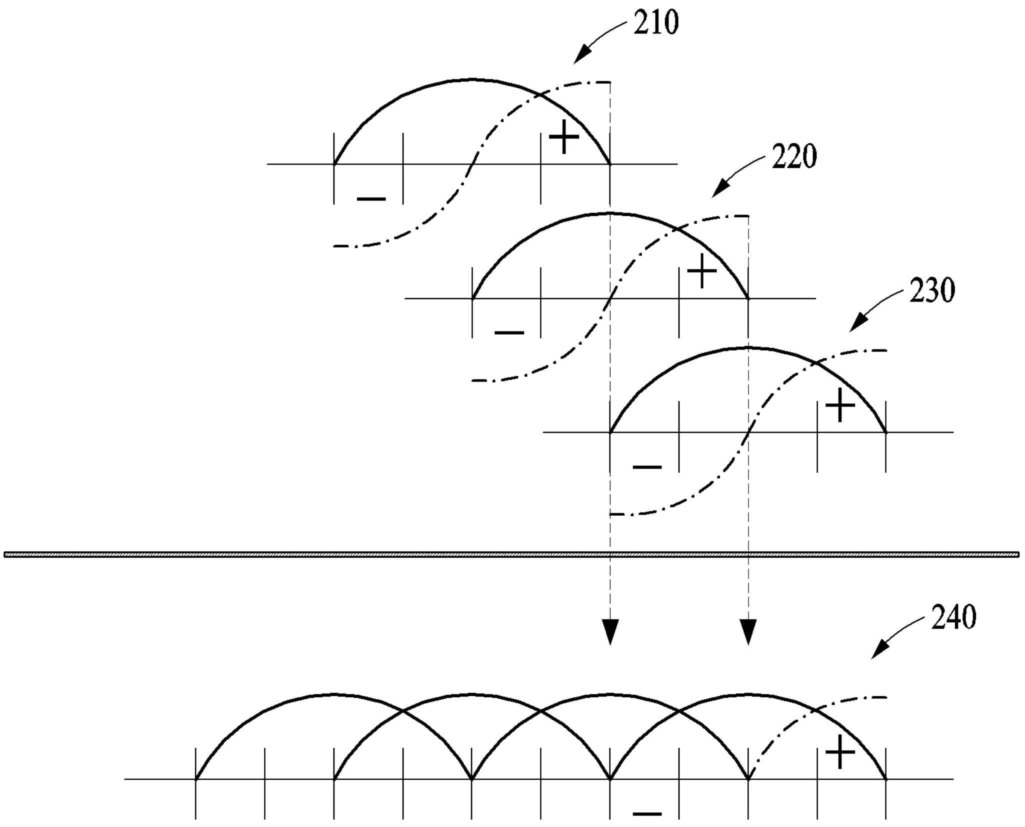
FIG. 2 illustrates the principle of a time domain aliasing cancellation (TDAC) operation.

FIG. 2 illustrates the principle of a TDAC operation.

As shown in FIG. 2, a TDAC may output a signal 240 in which time domain aliasing is removed by performing 50% overlap-add of a current frame 220 and neighboring frames about folding points. In this case, the neighboring frames may be a previous frame 210 and a subsequent frame 230 of the current frame 220. In addition, the folding points are two points at which the transform size is quartered, and are shown as vertical lines on the axis of each frame in FIG. 2.

Figure 3:
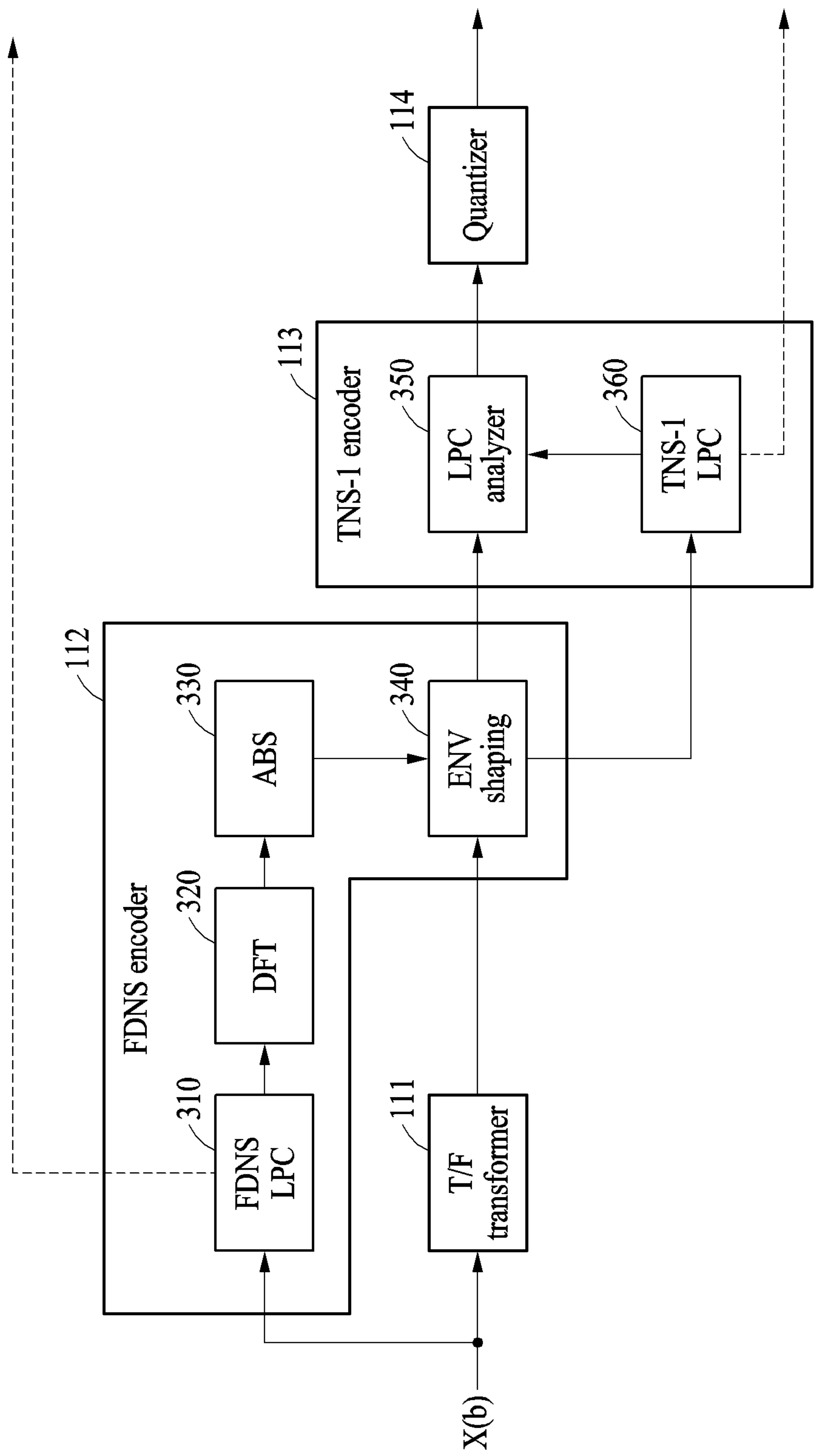
FIG. 3 illustrates a detailed configuration of the audio encoding apparatus according to the first example embodiment of the present disclosure.

FIG. 3 illustrates a detailed configuration of the audio encoding apparatus according to the first example embodiment of the present disclosure.

The FDNS encoder 112 may obtain LPC information from the input signal x(b). Next, the FDNS encoder 112 may obtain frequency axis envelope information from the LPC frequency information. Then, the FDNS encoder 112 may generate the frequency domain residual signal by removing the frequency axis envelope information from the frequency domain signal.

In this case, the FDNS encoder 112 may include an FDNS LPC 310, a discrete Fourier transform (DFT) 320, an ABS 330, and an ENV shaping 340, as shown in FIG. 3.

The FDNS LPC 310 may obtain an LPC from the input signal x(b). In addition, the FDNS LPC 310 may define the obtained LPC as LPC information of FDNS.

The DFT 320 may transform the LPC information into LPC frequency information in a frequency domain by DFT.

The ABS 330 may calculate an absolute value of the LPC frequency information by performing an absolute value (ABS) operation on the LPC frequency information.

The ENV shaping 340 may obtain the absolute value of the LPC frequency information as envelope information. In addition, the ENV shaping 340 may generate a frequency domain residual signal $r_f(b)$ by removing frequency axis envelope information from the frequency domain signal. For example, the ENV shaping 340 may output the frequency domain residual signal $r_f(b)$ by dividing a frequency domain signal $x_f(b)$ in which the input signal x(b) is MDCT-transformed by envelope information $env_f(b)$. That is, $r_f(b)=x_f(b)/env_f(b)$.

In this case, the TNS-1 encoder 113 may include an LPC analyzer 350 and a TNS-1 LPC 360, as shown in FIG. 3.

The LPC analyzer 350 may obtain the LPC from the frequency domain residual signal $r_f(b)$. In addition, the LPC analyzer 350 may define the obtained LPC as a TNS-1 LPC.

The TNS-1 LPC 360 may output a time domain residual signal $rr_f(b)$ in which the frequency axis envelope information and time axis envelope information is removed by LPC analysis of the frequency domain residual signal using the LPC obtained by the LPC analyzer 350. For example, the TNS-1 LPC 360 may output the time domain residual signal $rr_f(b)$ through a convolution operation between the frequency domain residual signal $r_f(b)$ and the LPC.

Figure 4:
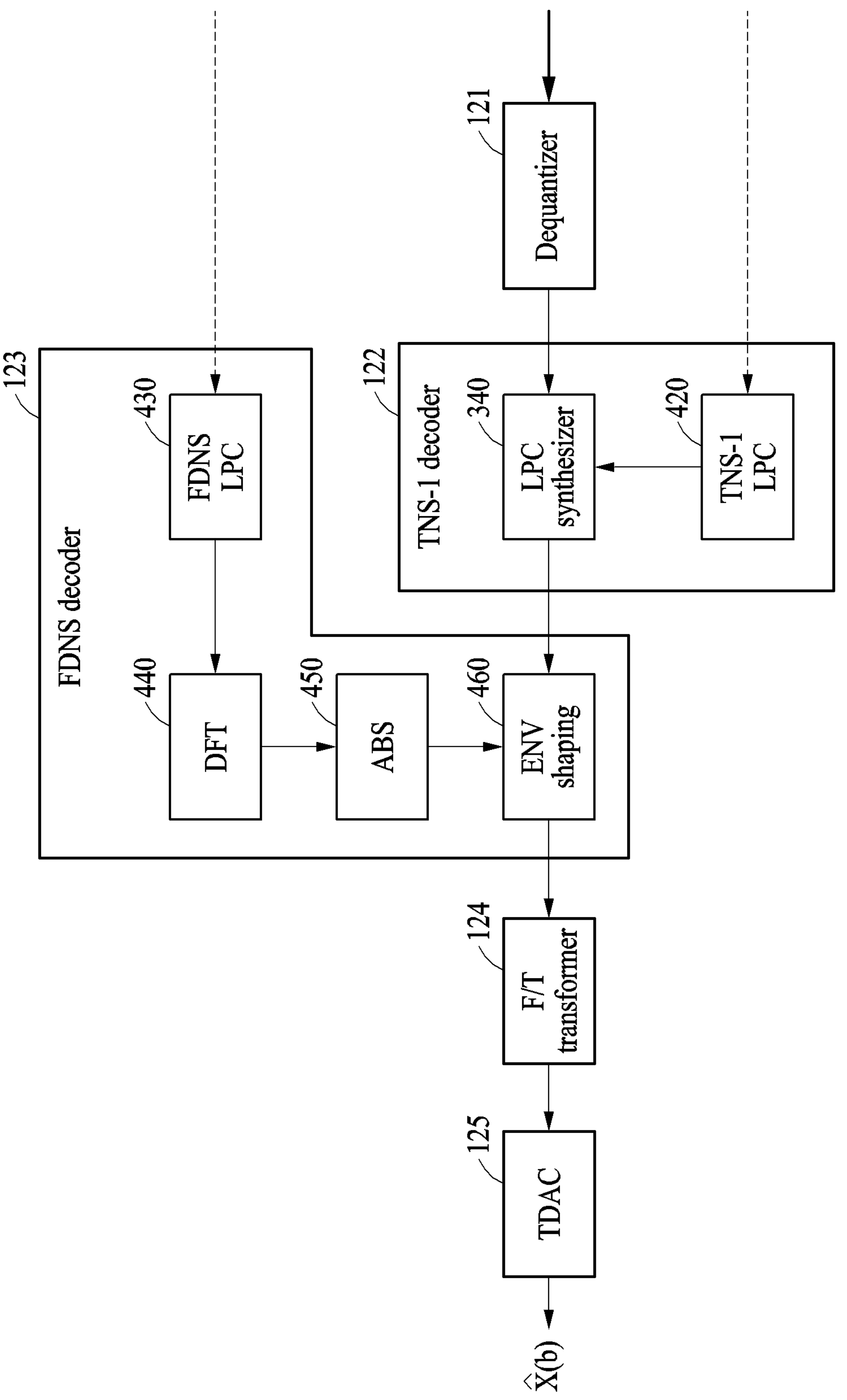
FIG. 4 illustrates a detailed configuration of the audio decoding apparatus according to the first example embodiment of the present disclosure.

FIG. 4 illustrates a detailed configuration of the audio decoding apparatus according to the first example embodiment of the present disclosure.

The dequantizer 121 may output a time domain residual signal $\widehat{rr}_f(b)$ by dequantizing a received signal that is received from the audio encoding apparatus 110.

The TNS-1 decoder 122 may include an LPC synthesizer 410 and a TNS-1 LPC 420, as shown in FIG. 4.

The TNS-1 LPC 420 may obtain an LPC of the audio encoding apparatus 110. In this case, the TNS-1 LPC 420 may extract an LPC included in the received signal, or receive an LPC from the TNS-1 LPC 360 of the audio encoding apparatus 110.

The LPC synthesizer 410 may output a frequency domain residual signal $\hat{r}_f(b)$ in which time axis envelope information is restored by LPC synthesis of the time domain residual signal $\widehat{rr}_f(b)$ using the LPC obtained by the TNS-1 LPC 420.

The FDNS decoder 123 may include an FDNS LPC 430, a DFT 440, an ABS 450, and an ENV shaping 450, as shown in FIG. 4.

The FDNS LPC 430 may obtain LPC information of FDNS. In this case, the FDNS LPC 430 may extract LPC information included in the received signal, or may receive LPC information from the FDNS LPC 310 of the audio encoding apparatus 110.

The DFT 430 may transform the LPC information into LPC frequency information in a frequency domain by DFT.

The ABS 440 may calculate an absolute value of the LPC frequency information by performing an ABS operation on the LPC frequency information.

The ENV shaping 450 may obtain the absolute value of the LPC frequency information as envelope information $env_f(b)$. In addition, the ENV shaping 450 may generate a frequency domain signal $\hat{x}_f(b)$ by restoring frequency axis envelope information $env_f(b)$ in the frequency domain residual signal $\widehat{r_f}(b)$. For example, $\widehat{x_f}(b)=\widehat{r_f}(b)\times env_f(b)$ may be satisfied.

The F/T transformer 124 may output a time domain signal by F/T-transform of the frequency domain signal $\widehat{x_f}(b)$ output from the FDNS decoder 123, and the TDAC 125 may output an input signal $\hat{x}(b)$ restored by performing TDAC on the time domain signal output from the F/T transformer 124.

Figure 5:
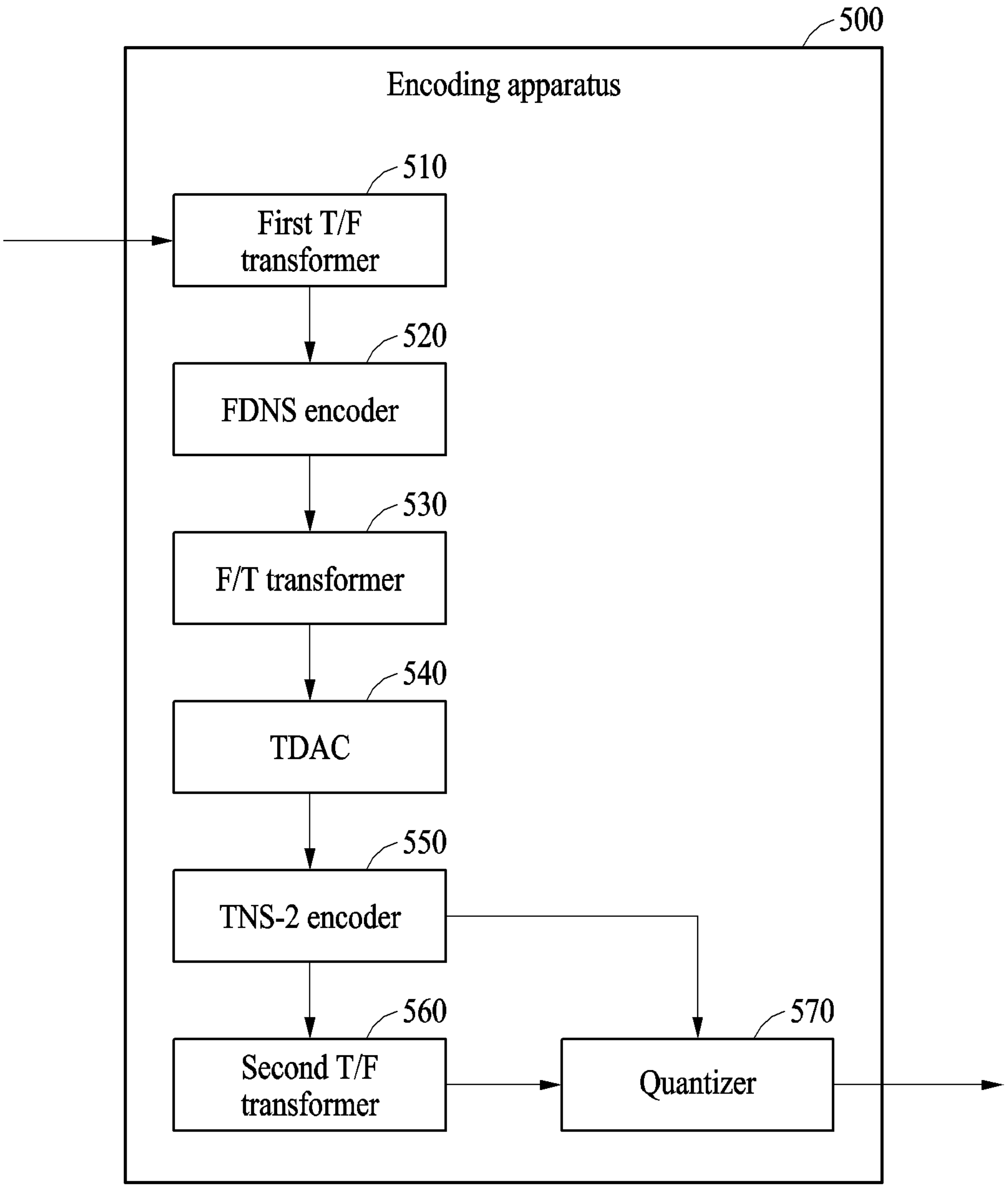
FIG. 5 illustrates an audio encoding apparatus according to a second example embodiment of the present disclosure.

FIG. 5 illustrates an audio encoding apparatus according to a second example embodiment of the present disclosure.

The audio encoding apparatus 500 may include a first T/F transformer 510, an FDNS encoder 520, an F/T transformer 530, a TDAC 540, a TNS-2 encoder 550, a second T/F transformer 560, and a quantizer 570, as shown in FIG. 5. At this time, the first T/F transformer 510, the FDNS encoder 520, the F/T transformer 530, the TDAC 540, the TNS-2 encoder 550, the second T/F transformer 560, and the quantizer 570 may be different processors, or separate modules included in a program executed by one processor. For example, the audio encoding apparatus 500 may be an encoder. In addition, the first T/F transformer 510 and the FDNS encoder 520 are the same elements as the T/F transformer 111 and the FDNS encoder 112 of FIG. 1. Thus, a detailed description thereof will be omitted.

The F/T transformer 530 may output a time domain signal by F/T-transform of the frequency domain residual signal output from the FDNS encoder 520.

The TDAC 540 may remove time domain aliasing by applying TDAC to the time domain signal output from the F/T transformer 530.

The TNS-2 encoder 550 may output a time domain residual signal in which a time axis envelope is removed by TNS-2 encoding of the time domain signal to which TDAC is applied.

The quantizer 570 may quantize the time domain residual signal output from the TNS-2 encoder 550, then transform the quantized time domain residual signal into a bitstream, and transmit the transformed time domain residual signal to an audio decoding apparatus 800. In this case, when the quantizer 570 performs time domain quantization, the audio encoding apparatus 500 may not include the second T/F transformer 560.

Alternatively, when the quantizer 570 performs frequency domain quantization, the audio encoding apparatus 500 may include the second T/F transformer 560. In this case, the second T/F transformer 560 may output a second frequency domain signal by T/F transform of the time domain residual signal output from the TNS-2 encoder 550. In this case, the second frequency domain signal may be a signal in which both a frequency axis envelope and a time axis envelope are removed. The quantizer 570 may quantize the second frequency domain signal, then transform the quantized frequency domain signal into a bitstream, and transmit the transformed frequency domain signal to the audio decoding apparatus 800.

The audio encoding apparatus 500 according to the second example embodiment of the present disclosure may transform the frequency domain residual signal in which the frequency envelope is removed into the time domain signal and then remove the time axis envelope by TNS-2 encoding, thereby achieving higher encoding efficiency than the audio encoding apparatus 110.

The detailed configuration and operation of the audio encoding apparatus 500 will be described in detail below with reference to FIGS. 6 and 7.

Figure 6:
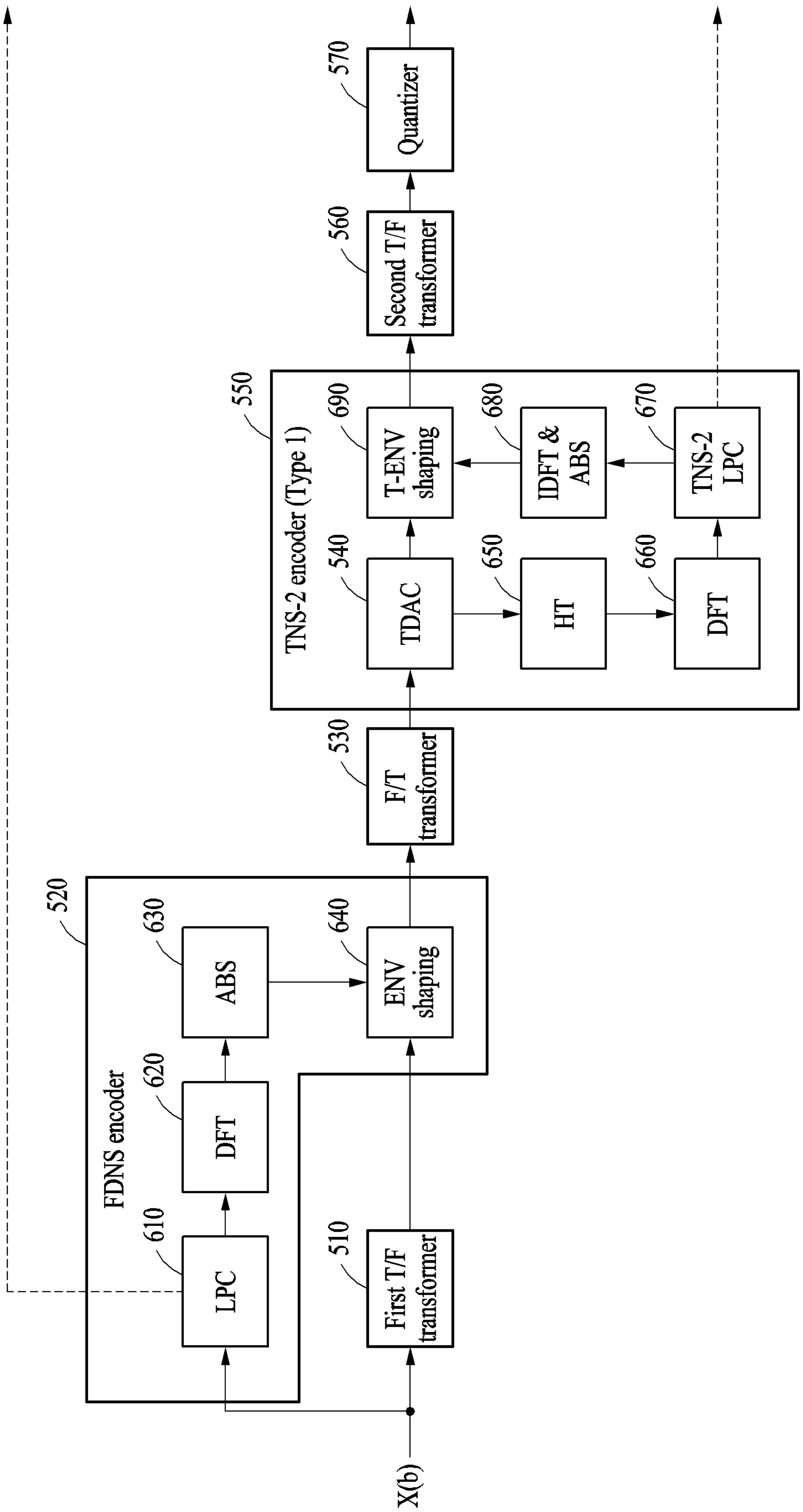
FIG. 6 is an example of a detailed configuration of the audio encoding apparatus according to the second example embodiment of the present disclosure.

FIG. 6 is an example of a detailed configuration of the audio encoding apparatus according to the second example embodiment of the present disclosure.

The FDNS encoder 520 may include an FDNS LPC 610, a DFT 620, an ABS 630, and an ENV shaping 640, as shown in FIG. 6. At this time, the FDNS LPC 610, the DFT 620, the ABS 630, and the ENV shaping 640 are the same elements as the FDNS LPC 310, the DFT 320, the ABS 330, and the ENV shaping 340 of FIG. 3. Thus, a detailed description thereof will be omitted.

The F/T transformer 530 may output a time domain signal by F/T-transform of the frequency domain residual signal $r_f(b)$ output from the FDNS encoder 520.

The TDAC 540 may output a time domain signal $r_t(b)$ in which time domain aliasing is removed by applying TDAC to the time domain signal output from the F/T transformer 530.

When the TNS-2 encoder 550 is of Type 1, the TNS-2 encoder 550 may include a Hilbert transform (HT) 650, a DFT 660, a TNS-2 LPC 670, an inverse DFT (IDFT)&ABS 680, and a T-ENV shaping 690.

The HT 650 may transform the time domain signal $r_t(b)$ into an analytic form $r_a$ (b) by Hilbert transform. For example, $r_a(b)=r_t(b)+jr_{ht}(b)$ may be satisfied. Also, $r_a(b)$ may be a complex number.

The DFT 660 may obtain a frequency coefficient in the form of a complex number by performing DFT on the analytic form $r_a(b)$.

The TNS-2 LPC 670 may obtain a complex LPC from the frequency coefficient in the form of a complex number.

The IDFT&ABS 680 may obtain time axis envelope information $env_t(b)$ by applying IDFT and an ABS operation to the complex LPC.

The T-ENV shaping 690 may obtain a time domain residual signal $rr_t(b)$ by removing the time axis envelope information $env_t(b)$ from the time domain signal $r_t(b)$. For example, $rr_t(b)=r_t(b)/env_t(b)$ may be satisfied.

Figure 7:
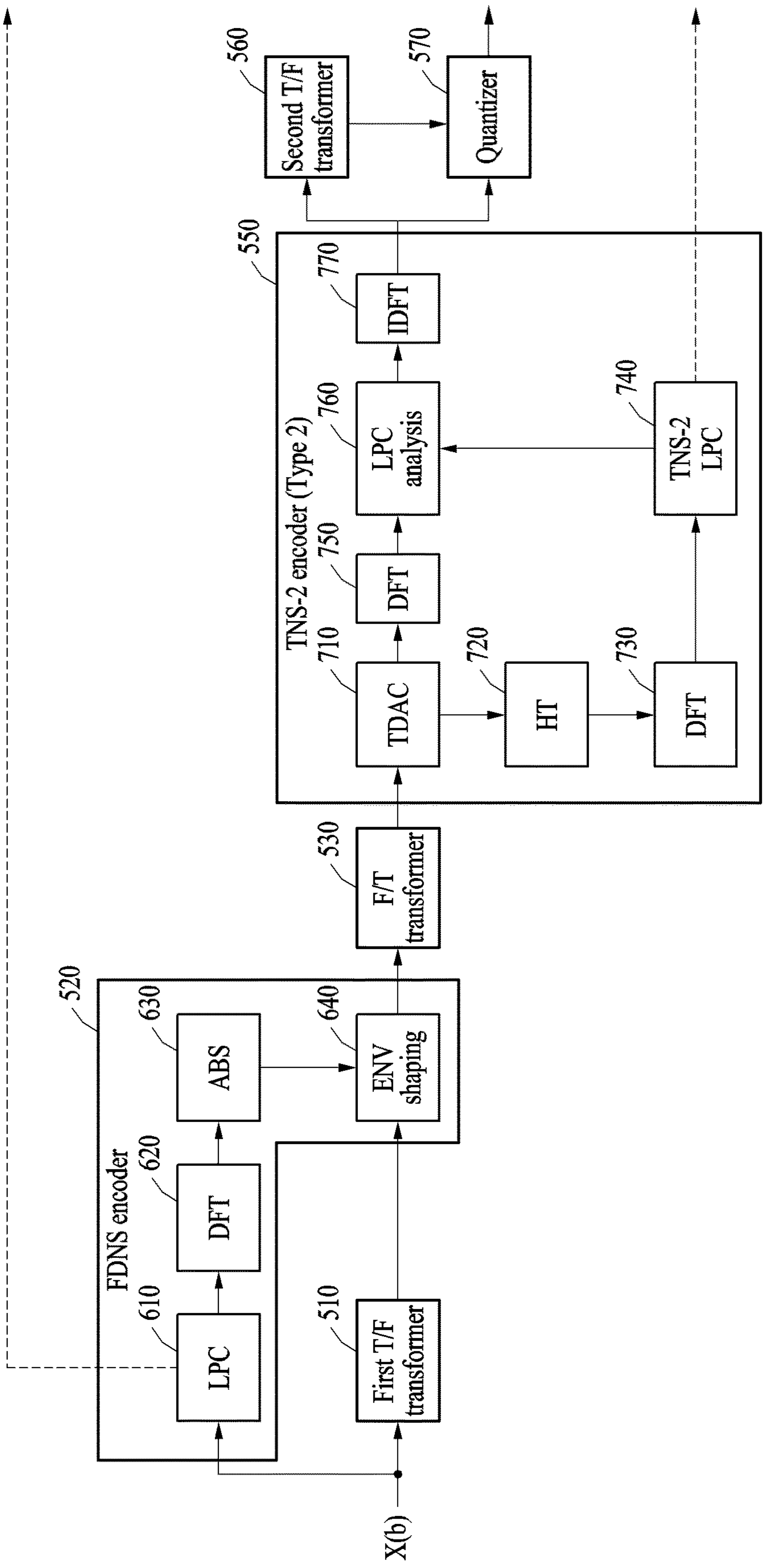
FIG. 7 is another example of a detailed configuration of the audio encoding apparatus according to the second example embodiment of the present disclosure.

FIG. 7 illustrates a detailed configuration of the audio encoding apparatus 500 when the TNS-2 encoder 550 is of Type 2.

The TNS-2 encoder 550 of Type 2 may include a TDAC 710, an HT 720, a DFT 730, a TNS-2 LPC 740, a DFT 750, an LPC analyzer 760, and an IDFT 770. At this time, the TDAC 710 is the same element as the TDAC 540 of FIG. 5. Thus, a detailed description thereof will be omitted. The HT 720 may transform the time domain signal r t (b) into an analytic form r a (b) by Hilbert transform.

The DFT 730 may obtain a frequency coefficient in the form of a complex number by performing DFT on the analytic form $r_a(b)$.

The TNS-2 LPC 740 may obtain a complex LPC from the frequency coefficient in the form of a complex number.

The DFT 750 may output a second frequency domain residual signal by performing DFT on the time domain signal $r_t(b)$.

The LPC analyzer 760 may remove time axis envelope information by LPC analysis of the second frequency domain residual signal using the complex LPC.

The IDFT 770 may obtain a time domain residual signal $rr_t(b)$ by applying IDFT to the second frequency domain residual signal in which the time axis envelope information is removed.

In this case, when the quantizer 570 performs time domain quantization, the IDFT 770 may transmit the time domain residual signal $rr_t(b)$ to the quantizer 570. The quantizer 570 may quantize the time domain residual signal $rr_t(b)$, then transform the quantized time domain residual signal into a bitstream, and transmit the transformed time domain residual signal to the audio decoding apparatus 800.

Alternatively, when the quantizer 570 performs frequency domain quantization, the IDFT 770 may transmit the time domain residual signal $rr_t(b)$ to the second T/F transformer 560. The second T/F transformer 560 may output a second frequency domain signal by T/F transform of the time domain residual signal $rr_t(b)$. Next, the quantizer 570 may quantize the second frequency domain signal, then transform the quantized frequency domain signal into a bitstream, and transmit the transformed frequency domain signal to the audio decoding apparatus 800.

Figure 8:
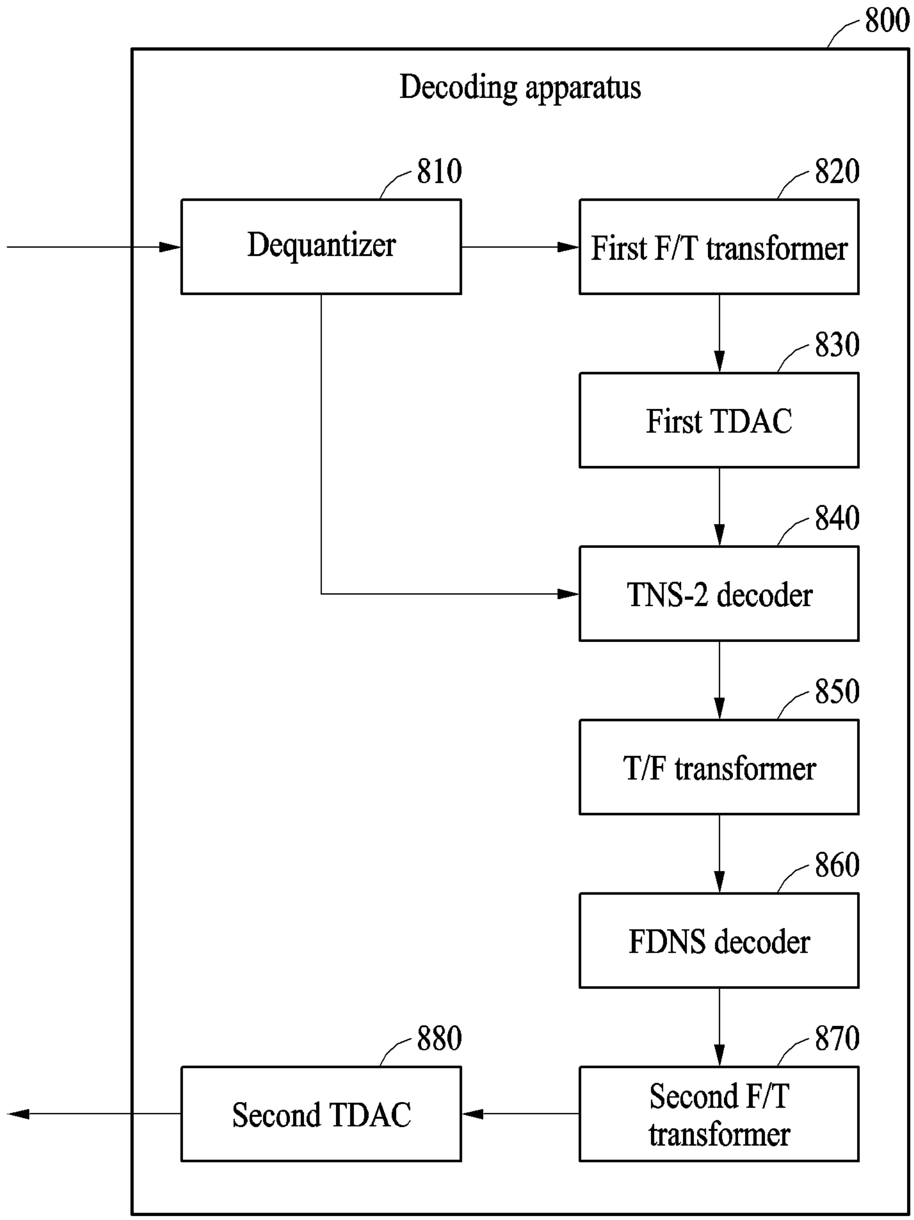
FIG. 8 illustrates an audio decoding apparatus according to the second example embodiment of the present disclosure.

FIG. 8 illustrates an audio decoding apparatus according to the second example embodiment of the present disclosure.

The audio decoding apparatus 800 may include a dequantizer 810, a first F/T transformer 820, a first TDAC 830, a TNS-2 decoder 840, a T/F transformer 850, an FDNS decoder 860, a second F/T transformer 870, and a second TDAC 880, as shown in FIG. 8. At this time, the dequantizer 810, the first F/T transformer 820, the first TDAC 830, the TNS-2 decoder 840, the T/F transformer 850, the FDNS decoder 860, the second F/T transformer 870, and the second TDAC 880 may be different processors, or separate modules included in a program executed by one processor.

When the audio encoding apparatus 500 performs quantization on a time axis, the dequantizer 810 may output a time domain residual signal $\widehat{rr}_t(b)$ by dequantizing a received signal on the time axis. The received signal may include at least one of LPC information extracted from an input signal input to an encoder, a complex LPC obtained from a time domain signal of the input signal, and a bitstream to which a time domain residual signal of the input signal is transformed after quantized, and the dequantizer 810 may restore the time domain residual signal $\widehat{rr}_t(b)$ by dequantizing the bitstream.

Meanwhile, when the audio encoding apparatus 500 performs quantization on a frequency axis, the dequantizer 810 may transmit a signal dequantized on the frequency axis to the first F/T transformer 820.

The first F/T transformer 820 may output a signal by F/T transform of the signal received from the dequantizer 810.

The first TDAC 830 may restore the time domain residual signal $\widehat{rr}_t(b)$ by removing time domain aliasing by applying TDAC to the signal output from the first F/T transformer 820.

The TNS-2 decoder 840 may output a time domain signal $\hat{r}_t(b)$ by TNS-2 decoding of the time domain residual signal $\widehat{rr}_t(b)$.

The T/F transformer 850 may output a frequency domain residual signal by T/F transform of the time domain signal $\hat{r}_t(b)$.

The FDNS decoder 860 may output a frequency domain signal $\hat{x}_f(b)$ by performing FDNS decoding on the frequency domain residual signal.

The second F/T transformer 870 may output a second time domain signal by F/T transform of the frequency domain signal $\hat{x}_f(b)$.

The second TDAC 880 may output a restored input signal $\hat{x}(b)$ by performing TDAC on the second time domain signal.

The detailed configuration and operation of the audio decoding apparatus 800 will be described in detail below with reference to FIGS. 9 and 10.

Figure 9:
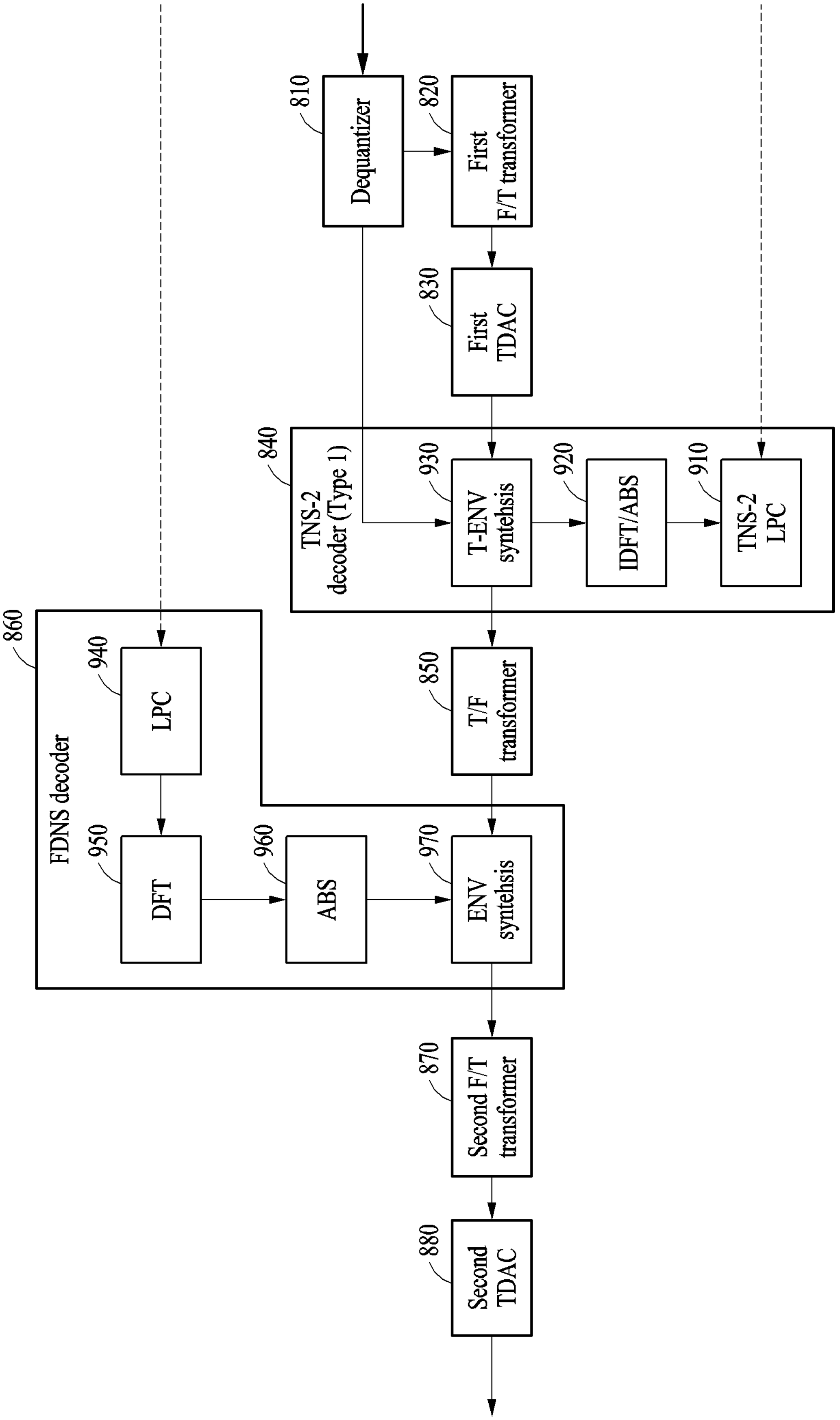
FIG. 9 is an example of a detailed configuration of the audio decoding apparatus according to the second example embodiment of the present disclosure.

FIG. 9 is an example of a detailed configuration of the audio decoding apparatus according to the second example embodiment of the present disclosure.

When the TNS-2 decoder 550 is of Type 1, the TNS-2 decoder 550 may include a TNS-2 LPC 910, an IDFT&ABS 920, and a T-ENV synthesizer 930.

The TNS-2 LPC 910 may obtain a complex LPC of the audio encoding apparatus 500. In this case, the TNS-2 LPC 910 may extract a complex LPC included in the received signal, or receive a complex LPC from the TNS-2 LPC 670 of the audio encoding apparatus 800.

The IDFT&ABS 920 may obtain time axis envelope information $env_t(b)$ by applying IDFT and an ABS operation to the complex LPC.

The T-ENV synthesizer 930 may output a time domain signal $\hat{r}_t(b)$ by restoring time axis envelope information $env_t(b)$ in the time domain residual signal $\widehat{rr}_t(b)$. For example, $\hat{r}_t(b)=\widehat{rr}_t(b)\times env_t(b)$ may be satisfied.

The FDNS decoder 860 may include an FDNS LPC 940, a DFT 950, an ABS 960, and an ENV shaping 970, as shown in FIG. 8. The FDNS LPC 940, the DFT 950, the ABS 960, and the ENV shaping 970 are the same elements as the FDNS LPC 430, the DFT 440, the ABS 450, and the ENV shaping 450 of FIG. 4. Thus, a detailed description thereof will be omitted.

Figure 10:
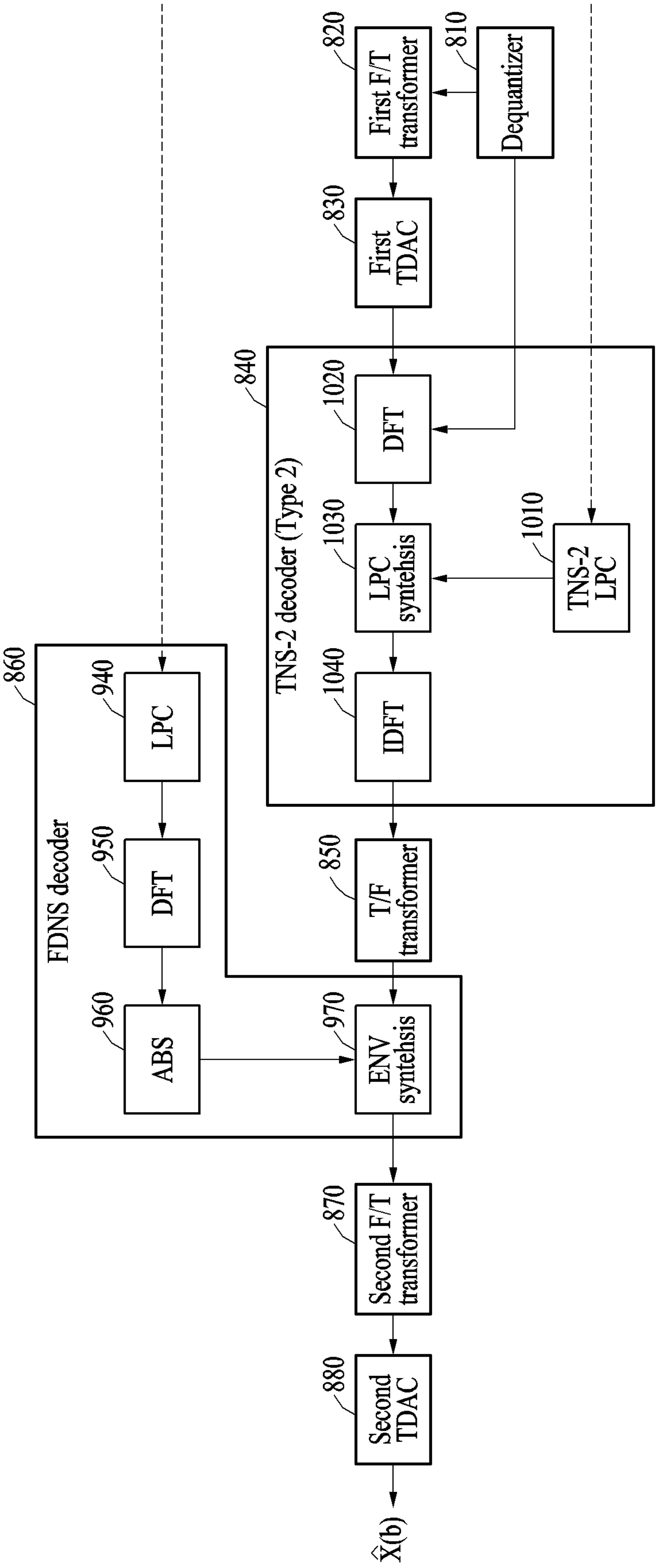
FIG. 10 is another example of a detailed configuration of the audio decoding apparatus according to the second example embodiment of the present disclosure.

FIG. 10 illustrates a detailed configuration of the audio encoding apparatus 800 when the TNS-2 decoder 840 is of Type 2.

The TNS-2 decoder 840 of Type 2 may include a TNS-2 LPC 1010, a DFT 1020, an LPC synthesizer 1030, and an IDFT 1040.

The TNS-2 LPC 1010 may obtain a complex LPC of the audio encoding apparatus 500. In this case, the TNS-2 LPC 1010 may extract a complex LPC included in the received signal, or receive a complex LPC from the TNS-2 LPC 740 of the audio encoding apparatus 800.

The DFT 1020 may output a second frequency domain residual signal by performing DFT on a time domain residual signal $\widehat{rr}_t$ t(b).

The LPC synthesizer 1030 may restore time axis envelope information by LPC analysis of the second frequency domain residual signal using the complex LPC.

The IDFT 1040 may obtain a time domain signal $\hat{r}_t(b)$ by applying IDFT to the second frequency domain residual signal in which the time axis envelope information is restored.

Figure 11:
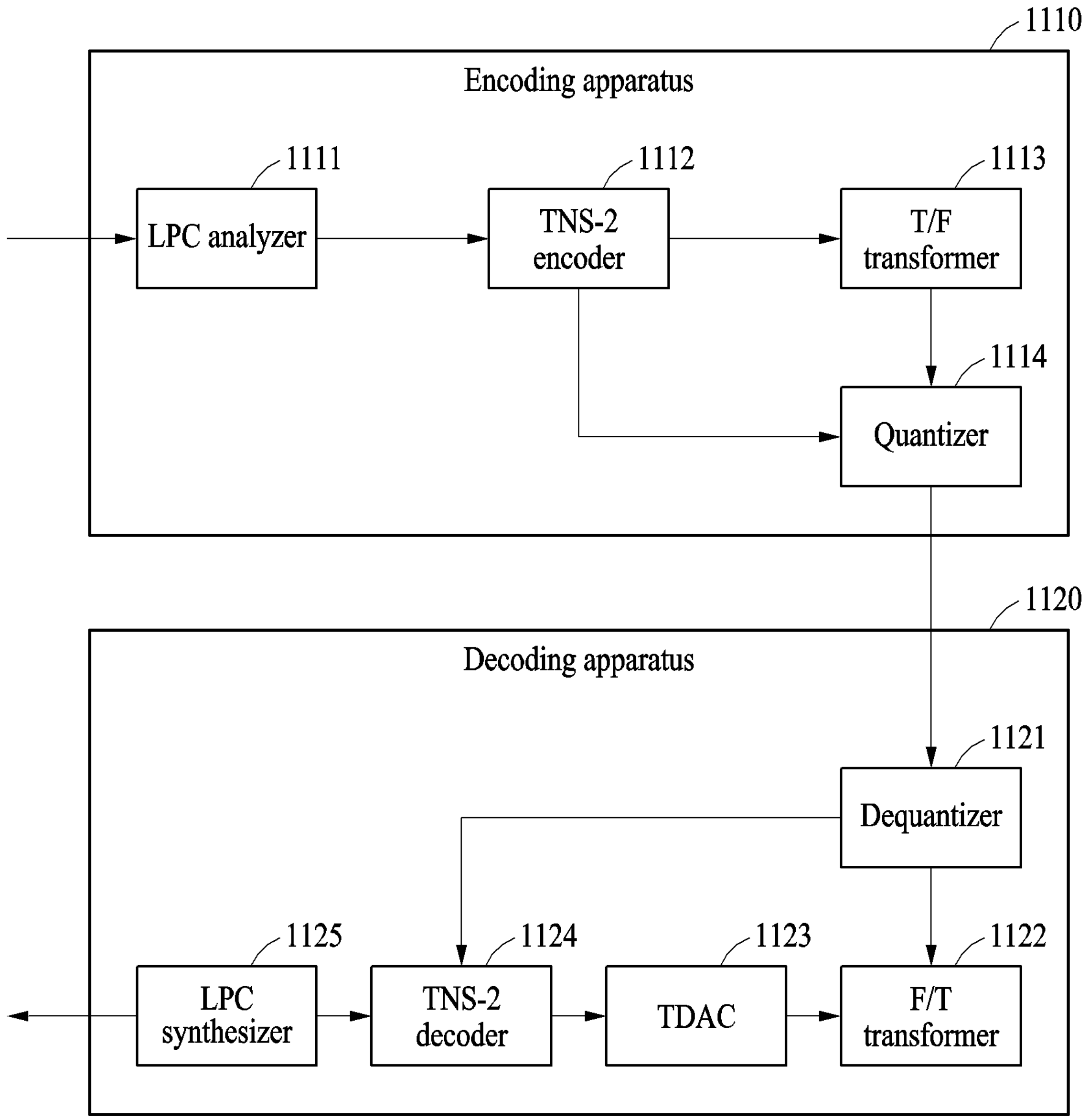
FIG. 11 illustrates audio encoding/decoding apparatuses according to a third example embodiment of the present disclosure.

FIG. 11 illustrates audio encoding/decoding apparatuses according to a third example embodiment of the present disclosure.

An audio encoding apparatus 1110 may include an LPC analyzer 1111, a TNS-2 encoder 1112, a T/F transformer 1113, and a quantizer 1114, as shown in FIG. 11. At this time, the LPC analyzer 1111, the TNS-2 encoder 1112, the T/F transformer 1113, and the quantizer 1114 may be different processors, or separate modules included in a program executed by one processor. For example, the audio encoding apparatus 110 may be an encoder.

The LPC analyzer 1111 may output a time domain signal in which a frequency axis envelope is removed by LPC analysis of an input signal. In this case, the LPC analyzer 1111 may obtain the time domain signal through a convolution of an LPC residual signal on a time axis.

The TNS-2 encoder 1112 may output a time domain residual signal in which a time axis envelope is removed by TNS-2 encoding of the time domain signal.

The quantizer 1114 may quantize and transmit the time domain residual signal.

The quantizer 1114 may quantize the time domain residual signal output from the TNS-2 is encoder 1113, then transform the quantized time domain residual signal into a bitstream, and transmit the transformed time domain residual signal to an audio decoding apparatus 1120. In this case, when the quantizer 1114 performs time domain quantization, the audio encoding apparatus 1110 may not include the T/F transformer 1113.

Alternatively, when the quantizer 1114 performs frequency domain quantization, the audio encoding apparatus 1110 may include the T/F transformer 1113. In this case, the T/F transformer 1113 may output a second frequency domain signal by T/F transform of the time domain residual signal output from the TNS-2 encoder 1113. In this case, the second frequency domain signal may be a signal in which both a frequency axis envelope and a time axis envelope are removed. The quantizer 1114 may quantize the second frequency domain signal, then transform the quantized frequency domain signal into a bitstream, and transmit the transformed frequency domain signal to the audio decoding apparatus 1120.

The audio encoding apparatus 1110 according to the third example embodiment of the present disclosure may remove a frequency envelope by performing LPC analysis, transform the frequency domain residual signal in which the frequency envelope is removed into the time domain signal and then remove the time axis envelope by TNS-2 encoding, thereby achieving higher encoding efficiency than the audio encoding apparatus 110.

The detailed configuration and operation of the audio encoding apparatus 1110 will be described in detail below with reference to FIG. 12.

The audio decoding apparatus 1120 may include a dequantizer 1121, an F/T transformer 1122, a TDAC 1123, a TNS-2 decoder 1124, and an LPC synthesizer 1125, as shown in FIG. 11. At this time, the dequantizer 1121, the F/T transformer 1122, the TDAC 1123, the TNS-2 decoder 1124, and the LPC synthesizer 1125 may be different processors, or separate modules included in a program executed by one processor.

The dequantizer 1121 may output a time domain residual signal by dequantizing a received signal.

When the audio encoding apparatus 1110 performs quantization on a time axis, the dequantizer 1121 may output a time domain residual signal $\widehat{rr}_t$(b) by dequantizing the received signal on the time axis. The received signal may include at least one of LPC information extracted from an input signal input to an encoder, a complex LPC obtained from a time domain signal of the input signal, and a bitstream to which a time domain residual signal of the input signal is transformed after quantized, and the dequantizer 1121 may restore the time domain residual signal $\widehat{rr}_t$(b) by dequantizing the bitstream.

Meanwhile, when the audio encoding apparatus 1110 performs quantization on a frequency axis, the dequantizer 1121 may transmit a signal dequantized on the frequency axis to the F/T transformer 1122.

The F/T transformer 1122 may output a signal by F/T transform of the signal received from the dequantizer 1121.

The TDAC 1123 may restore the time domain residual signal $\widehat{rr}_t$(b) by removing time domain aliasing by applying TDAC to the signal output from the F/T transformer 1122.

The TNS-2 decoder 1124 may output a time domain signal by TNS-2 decoding of the time domain residual signal $\widehat{rr}_t$(b).

The LPC synthesizer 1125 may restore an input signal by synthesizing the time domain signal output from the TNS-2 decoder 1124 with the LPC information received from the audio encoding apparatus 1110.

The detailed configuration and operation of the audio decoding apparatus 1120 will be described in detail below with reference to FIG. 13.

Figure 12:
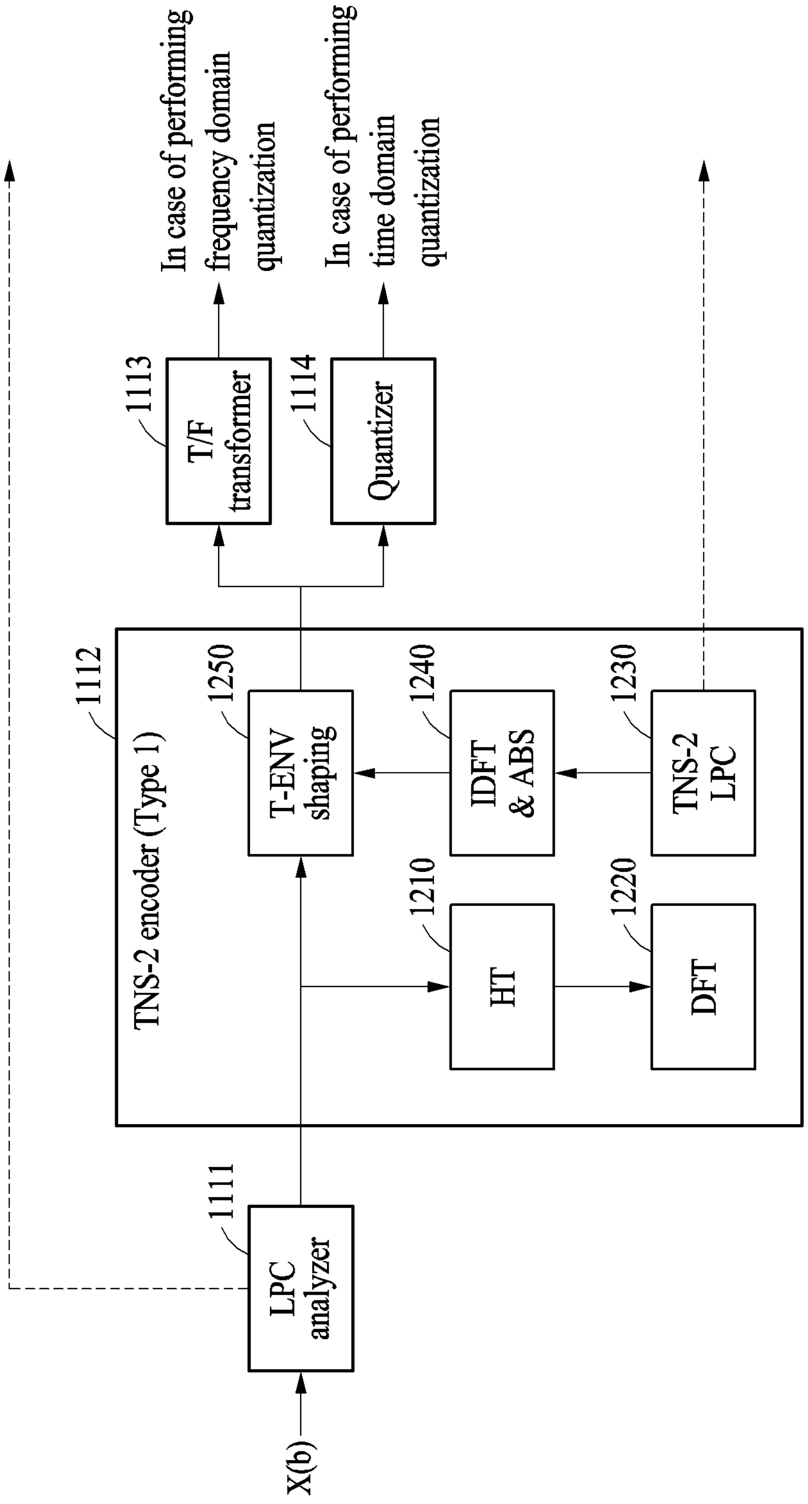
FIG. 12 illustrates a detailed configuration of the audio encoding apparatus according to the third example embodiment of the present disclosure.

FIG. 12 illustrates a detailed configuration of the audio encoding apparatus according to the third example embodiment of the present disclosure.

The LPC analyzer 1111 may output a time domain signal $r_t$(b) in which a frequency axis envelope is removed by LPC analysis of an input signal. At this time, the audio encoding apparatus 1110 may immediately apply TNS-2 without applying TDAC since the time domain signal $r_t$(b) in which the frequency axis envelope is removed is obtained by LPC analysis on a time axis.

When the TNS-2 encoder 1112 is of Type 1, the TNS-2 encoder 1112 may include an HT 1210, a DFT 1220, a TNS-2 LPC 1230, an IDFT&ABS 1240, and a T-ENV shaping 1250.

The HT 1210 may transform the time domain signal $r_t$(b) into an analytic form $r_a$(b) by Hilbert transform. For example, $r_a(b)=r_t(b)+jr_{ht}(b)$ may be satisfied. Also, $r_a$(b) may be a complex number.

The DFT 1220 may obtain a frequency coefficient in the form of a complex number by performing DFT on the analytic form $r_a$(b).

The TNS-2 LPC 1230 may obtain a complex LPC from the frequency coefficient in the form of a complex number.

The IDFT&ABS 1240 may obtain time axis envelope information $env_t$(b) by applying IDFT and an ABS operation to the complex LPC.

The T-ENV shaping 1250 may obtain a time domain residual signal $rr_t$(b) by removing the time axis envelope information $env_t$(b) from the time domain signal $r_t$(b). For example, $rr_t(b)=r_t(b)/env_t(b)$ may be satisfied.

Figure 13:
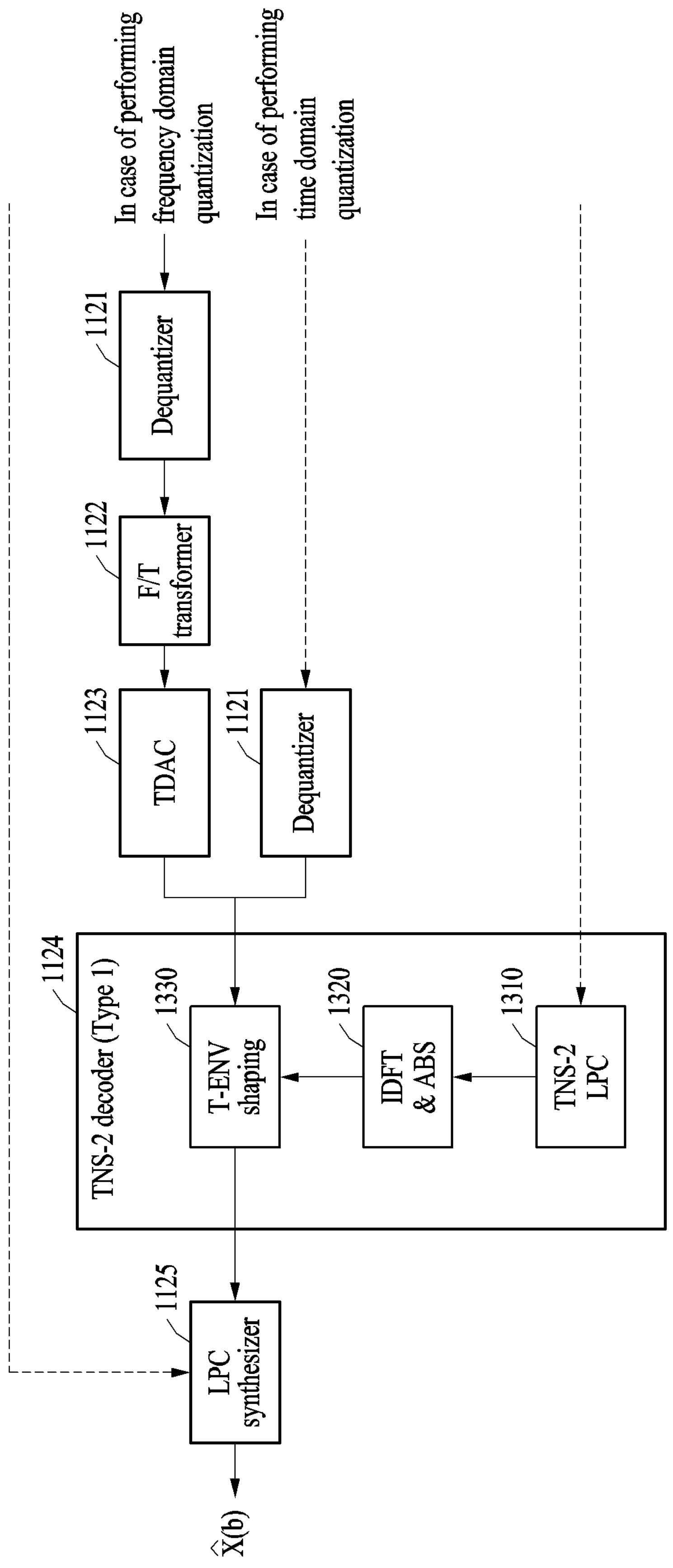
FIG. 13 illustrates a detailed configuration of the audio decoding apparatus according to the third example embodiment of the present disclosure.

FIG. 13 illustrates a detailed configuration of the audio decoding apparatus according to the third example embodiment of the present disclosure.

When the TNS-2 decoder 1124 is of Type 1, the TNS-2 decoder 1124 may include a TNS-2 LPC 1310, an IDFT&ABS 1320, and a T-ENV synthesizer 1330.

The TNS-2 LPC 1310 may obtain a complex LPC of the audio encoding apparatus 1110. In this case, the TNS-2 LPC 1310 may extract a complex LPC included in the received signal, or receive a complex LPC from the TNS-2 LPC 1230 of the audio encoding apparatus 1110.

The IDFT&ABS 1320 may obtain time axis envelope information $env_t$(b) by applying IDFT and an ABS operation to the complex LPC.

The T-ENV synthesizer 1330 may output a time domain signal $\hat{r}_t$(b) by restoring time axis envelope information $env_t$(b) in the time domain residual signal $\widehat{rr}_t$(b). For example, $\hat{r}_t(b)=\widehat{rr}_t(b)\times env_t(b)$ may be satisfied.

The LPC synthesizer 1125 may output a restored input signal $\hat{x}_t$(b) by restoring frequency envelope information by synthesizing the time domain signal $\hat{r}_t$(b) output from the TNS-2 decoder 1124 with the LPC information received from the audio encoding apparatus 1110.

Figure 14:
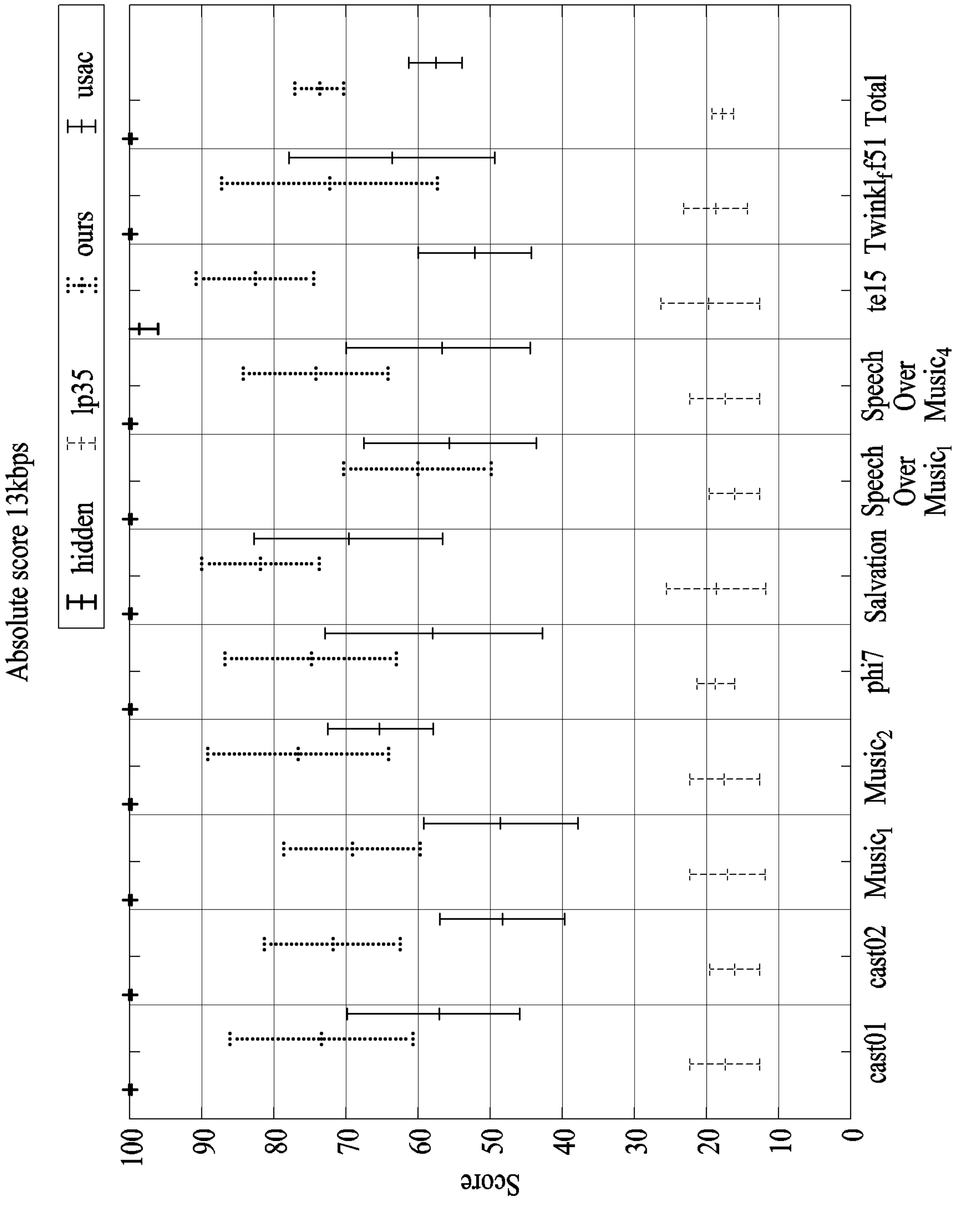
FIG. 14 is an example of results of comparing a performance of an audio encoding apparatus according to an example embodiment of the present disclosure.

FIG. 14 is an example of results of comparing a performance of an audio encoding apparatus according to an example embodiment of the present disclosure.

An example of listening test results using audios encoded by the audio encoding apparatus according to an example embodiment of the present disclosure and conventional audio encoding apparatuses is shown.

The following four systems are tested.

Hidden: denotes hidden reference and is an original signal, and does not reflect the hidden in a statistical aggregation of the results through post-screen when a score is less than or equal to 90 as a result of evaluation by subjects;

Lp35: is an anchor signal, and included as a system to be tested to help with perceptual determination on a minimum sound quality by applying a low-pass filter at 3.5 kHz;

Ours: is an audio encoding apparatus according to an example embodiment of the present disclosure; and USAC: stands for unified speech and audio coding and is an audio encoding apparatus to which best-performance audio codec is applied.

According to the results shown in FIG. 14, it may be learned that the audio encoding method according to an example embodiment of the present disclosure exhibits improved performance over USAC having the best performance among the conventional audio encoding apparatuses.

Figure 15:
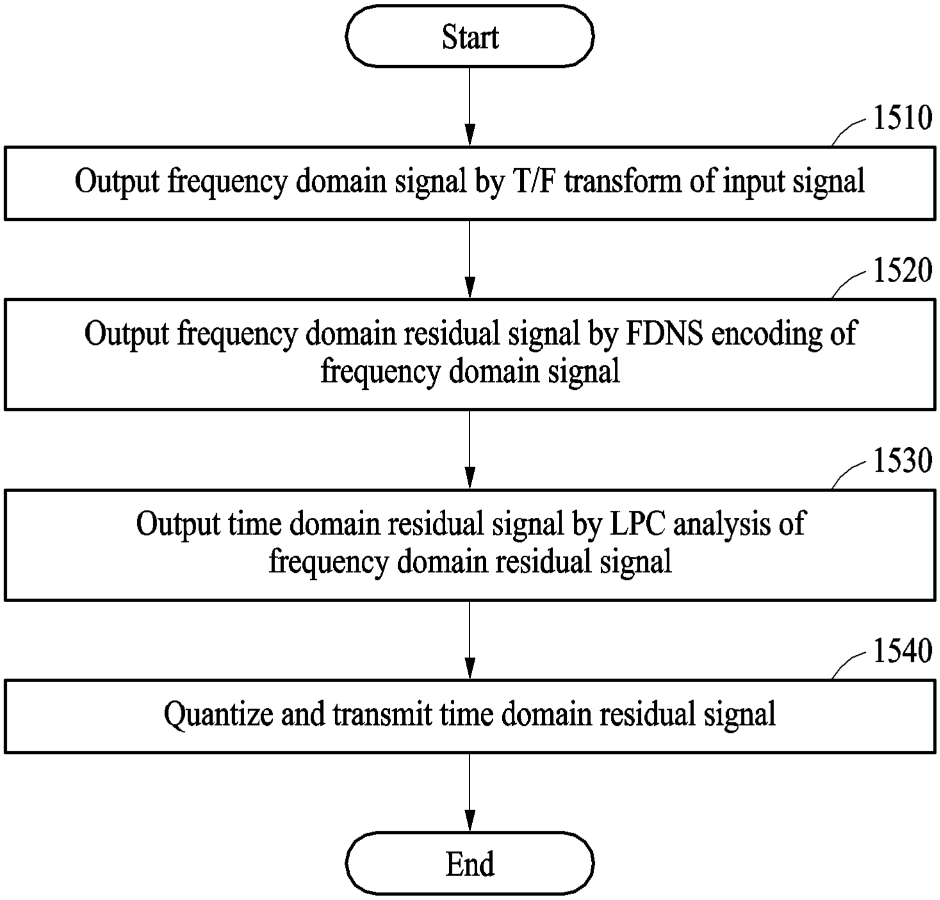
FIG. 15 is a flowchart illustrating an audio encoding method according to the first example embodiment of the present disclosure.

FIG. 15 is a flowchart illustrating an audio encoding method according to the first example embodiment of the present disclosure.

In operation 1510, the T/F transformer 111 may output a frequency domain signal by T/F-transform of an input signal. For example, the T/F transformer 111 may perform T/F transform of the input signal into the frequency domain signal using MDCT.

In operation 1520, the FDNS encoder 112 may output a frequency domain residual signal by applying FDNS encoding to the frequency domain signal output in operation 1510.

In operation 1530, the TNS-1 encoder 113 may output a time domain residual signal in which a time axis envelope is removed by performing LPC analysis based on the frequency domain residual signal output in operation 1520.

In operation 1540, the quantizer 114 may quantize the time domain residual signal output in operation 1530, then transform the quantized time domain residual signal into a bitstream, and transmit the transformed time domain residual signal to the audio decoding apparatus 120.

Figure 16:
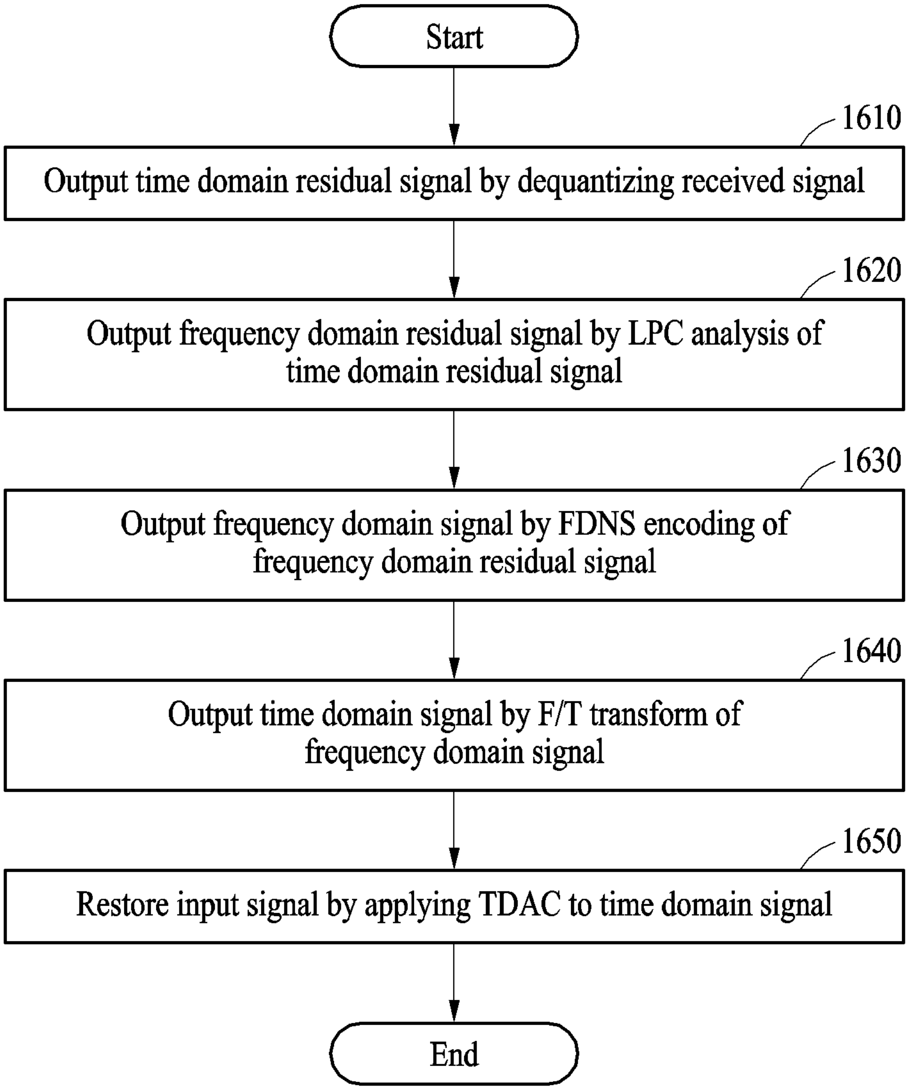
FIG. 16 is a flowchart illustrating an audio decoding method according to the first example embodiment of the present disclosure.

FIG. 16 is a flowchart illustrating an audio decoding method according to the first example embodiment of the present disclosure.

In operation 1610, the dequantizer 121 may output a time domain residual signal by dequantizing a received signal that is received from the audio encoding apparatus 110. In this case, the received signal may include at least one of LPC information extracted from the input signal input to the audio encoding apparatus 110, an LPC obtained from the frequency domain residual signal of the input signal, and the bitstream to which the time domain residual signal of the input signal is transformed after quantized. In addition, the dequantizer 121 may restore the time domain residual signal by dequantizing the bitstream.

In operation 1620, the TNS-1 decoder 122 may output a frequency domain residual signal by LPC analysis of the time domain residual signal output in operation 1610.

In operation 1630, the FDNS decoder 123 may output a frequency domain signal by performing FDNS decoding on the frequency domain residual signal output in operation 1620.

In operation 1640, the F/T transformer 124 may output a time domain signal by F/T-transform of the frequency domain signal output in operation 1630. For example, the F/T transformer 124 may perform F/T transform of the frequency domain signal into the time domain signal using IMDCT.

In operation 1650, the TDAC 125 may restore an input signal by performing TDAC on the time domain signal output in operation 1640.

Figure 17:
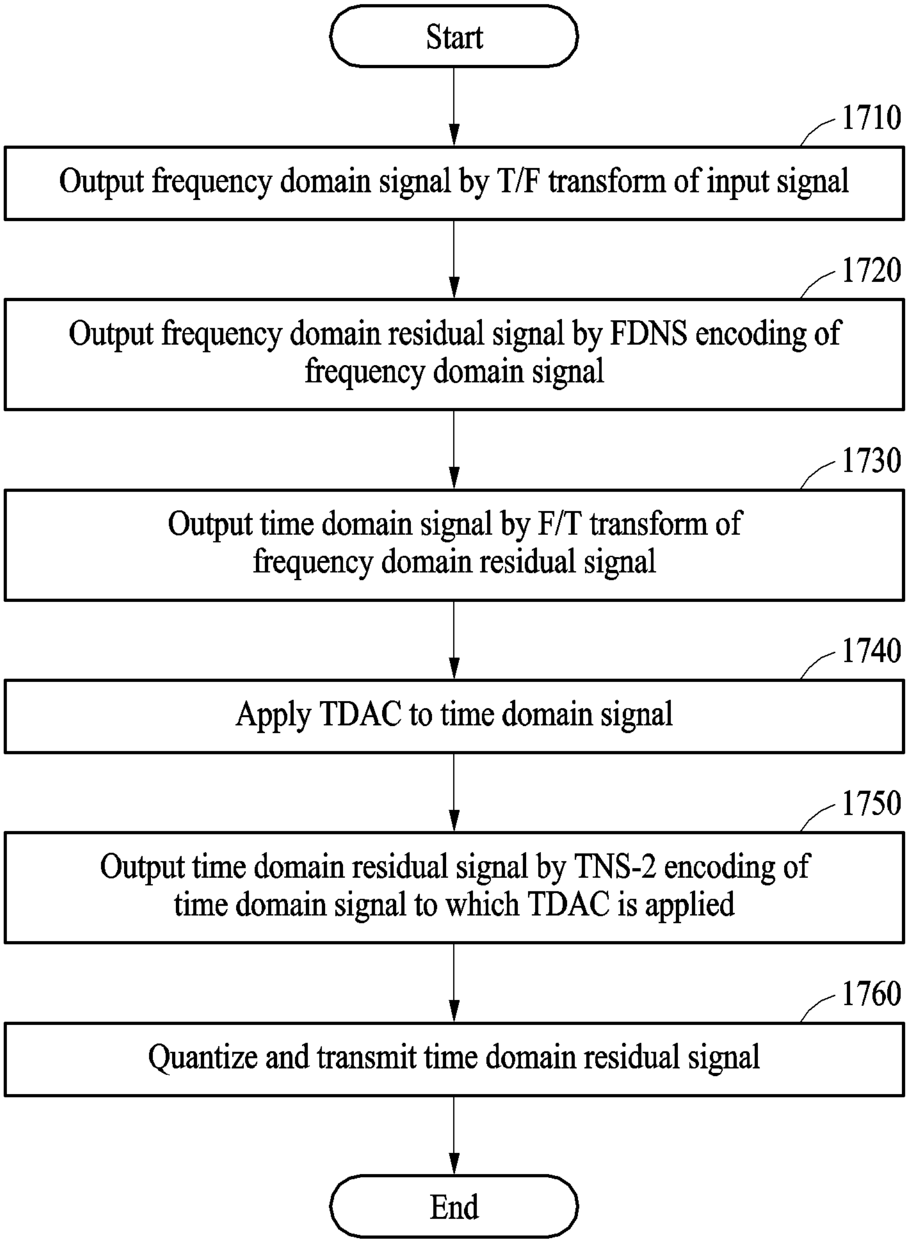
FIG. 17 is a flowchart illustrating an audio encoding method according to the second example embodiment of the present disclosure.

FIG. 17 is a flowchart illustrating an audio encoding method according to the second example embodiment of the present disclosure.

In operation 1710, the T/F transformer 111 may output a frequency domain signal by T/F transform of an input signal. For example, the T/F transformer 111 may perform T/F transform of the input signal into the frequency domain signal using MDCT.

In operation 1720, the FDNS encoder 112 may output a frequency domain residual signal by applying FDNS encoding to the frequency domain signal output in operation 1510.

In operation 1730, the F/T transformer 530 may output a time domain signal by F/T-transform of the frequency domain residual signal output in operation 1720.

In operation 1740, the TDAC 540 may remove time domain aliasing by applying TDAC to the time domain signal output in operation 1730.

In operation 1750, the TNS-2 encoder 550 may output a time domain residual signal in which a time axis envelope is removed by TNS-2 encoding of the time domain signal to which TDAC is applied.

In operation 1760, the quantizer 570 may quantize the time domain residual signal output in operation 1750, then transforms the quantized time domain residual signal into a bitstream, and transmit the transformed time domain residual signal to the audio decoding apparatus 800.

Figure 18:
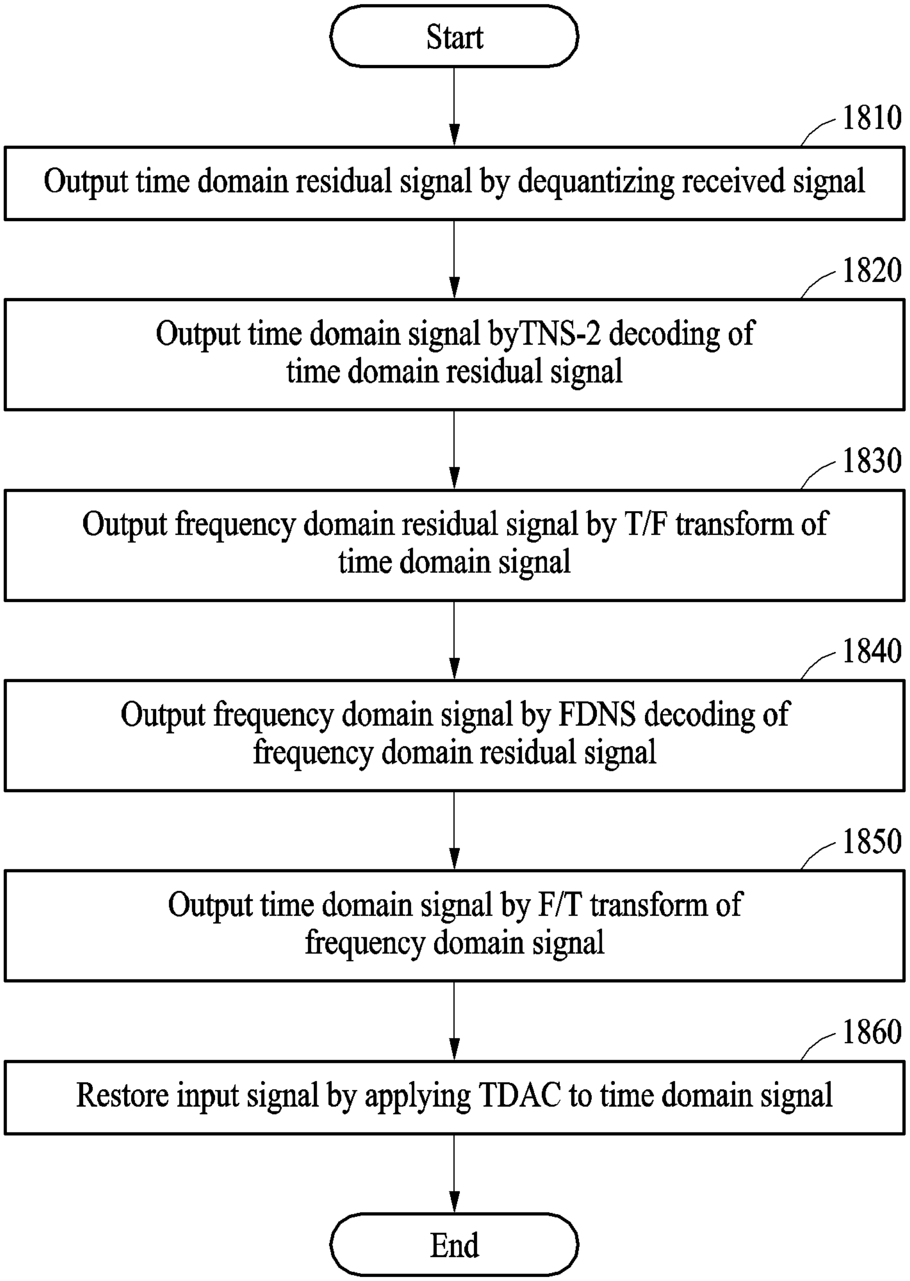
FIG. 18 is a flowchart illustrating an audio decoding method according to the second example embodiment of the present disclosure.

FIG. 18 is a flowchart illustrating an audio decoding method according to the second example embodiment of the present disclosure.

In operation 1810, the dequantizer 810 may output a time domain residual signal $\hat{x}_f(b)$ by dequantizing a received signal on a time axis.

In operation 1820, the TNS-2 decoder 840 may output a time domain signal $\widehat{rr}_t(b)$ by TNS-2 decoding of the time domain residual signal output in operation 1810.

In operation 1830, the T/F transformer 850 may output a frequency domain residual signal by T/F-transform of the time domain signal $\hat{r}_t(b)$ output in operation 1820.

In operation 1840, the FDNS decoder 860 may output a frequency domain signal $\hat{x}_f(b)$ by performing FDNS decoding on the frequency domain residual signal output in operation 1830.

In operation 1850, the second F/T transformer 870 may output a second time domain signal by F/T transform of the frequency domain signal $\hat{x}_f(b)$ output in operation 1840.

In operation 1860, the second TDAC 880 may output a restored input signal $\hat{x}(b)$ by performing TDAC on the second time domain signal output in operation 1850.

Figure 19:
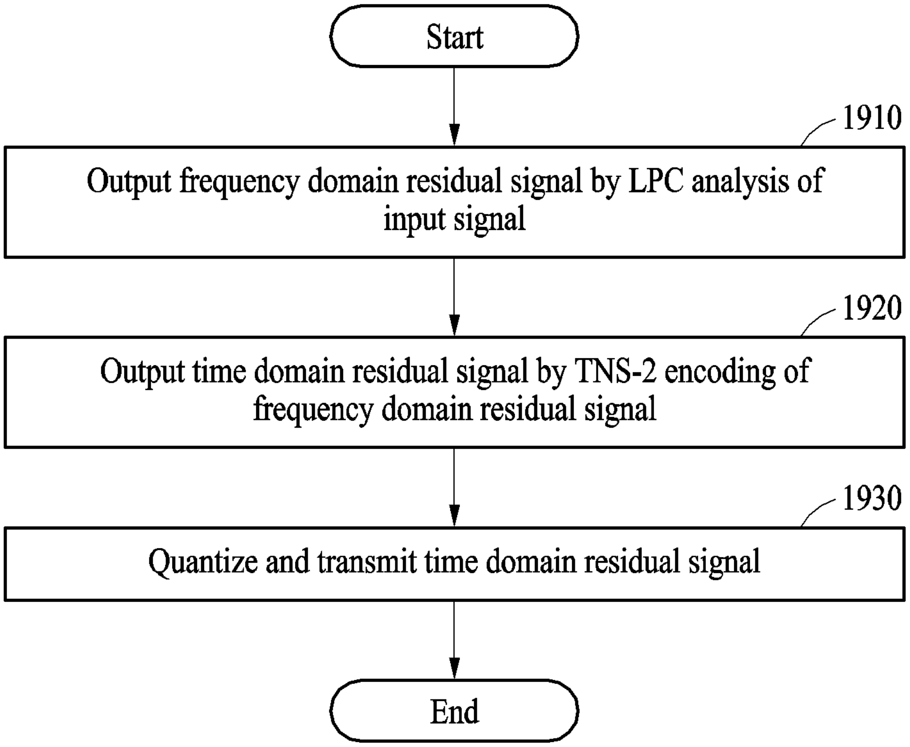
FIG. 19 is a flowchart illustrating an audio encoding method according to the third example embodiment of the present disclosure.

FIG. 19 is a flowchart illustrating an audio encoding method according to the third example embodiment of the present disclosure.

In operation 1910, the LPC analyzer 1111 may output a time domain signal in which a frequency axis envelope is removed by LPC analysis of an input signal.

In operation 1910, the TNS-2 encoder 1112 may output a time domain residual signal in which a time axis envelope is removed by TNS-2 encoding of the time domain signal output in operation 1910.

In operation 1930, the quantizer 1114 may quantize and transmit the time domain residual signal output in operation 1910.

Figure 20:
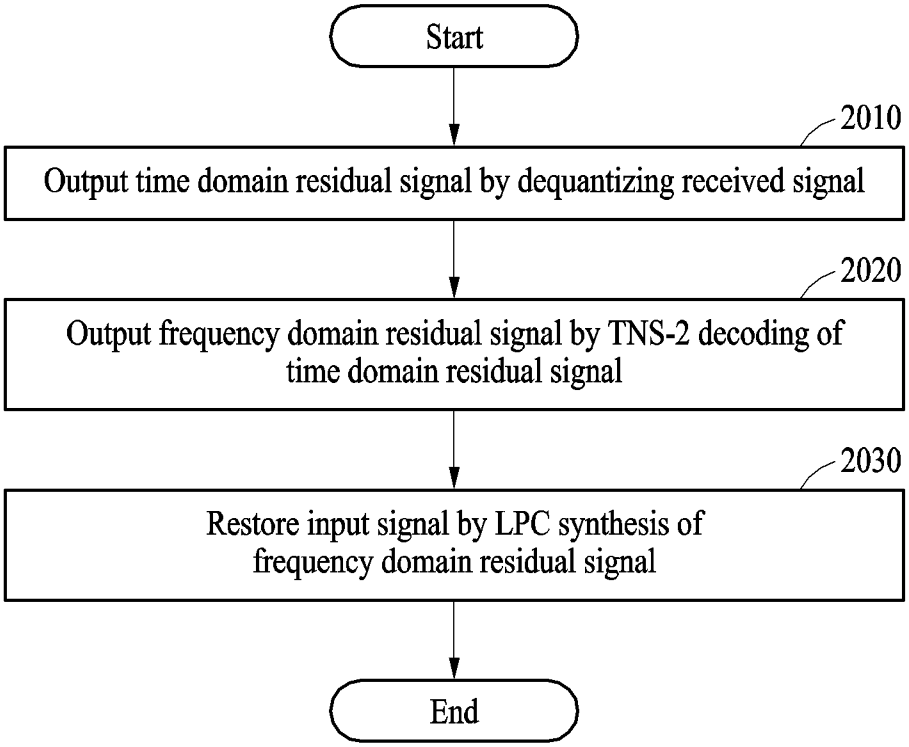
FIG. 20 is a flowchart illustrating an audio decoding method according to the third example embodiment of the present disclosure.

FIG. 20 is a flowchart illustrating an audio decoding method according to the third example embodiment of the present disclosure.

In operation 2010, the dequantizer 1121 may output a time domain residual signal by dequantizing a received signal.

In operation 2020, the TNS-2 decoder 1124 may output a time domain signal by TNS-2 decoding of the time domain residual signal $\widehat{rr}_t(b)$ output in operation 2010.

In operation 2030, the LPC synthesizer 1125 may restore an input signal by synthesizing the time domain signal output from the TNS-2 decoder 1124 in operation 2020 with LPC information received from the audio encoding apparatus 1110.

The audio encoding apparatus 110 may apply a TNS technique that smooths time axis information in a frequency domain residual signal output by applying FDNS encoding, thereby increasing encoding efficiency.

The audio encoding apparatus 500 may transform the frequency domain residual signal in which the frequency envelope is removed into the time domain signal and then remove the time axis envelope by TNS-2 encoding, thereby achieving higher encoding efficiency than the audio encoding apparatus 110.

The audio encoding apparatus 1110 may remove a frequency envelope by performing LPC analysis, transform the frequency domain residual signal in which the frequency envelope is removed into the time domain signal and then remove the time axis envelope by TNS-2 encoding, thereby achieving higher encoding efficiency than the audio encoding apparatus 110.

Meanwhile, the audio encoding/decoding apparatuses or the audio encoding/decoding methods according to the present disclosure may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

The invention claimed is:

1. An audio decoding method comprising:

outputting a time domain residual signal by dequantizing a received signal;

outputting a frequency domain residual signal by linear prediction coefficient (LPC) analysis of the time domain residual signal;

outputting a frequency domain signal by performing frequency domain noise shaping (FDNS) decoding on the frequency domain residual signal;

outputting a time domain signal by frequency-to-time (F/T) transform of the frequency domain signal; and restoring an input signal by performing time domain aliasing cancellation (TDAC) on the time domain signal.

2. The audio decoding method of claim 1, wherein the received signal comprises at least one of LPC information extracted from an input signal input to an audio encoding apparatus, an LPC obtained from a frequency domain residual signal of the input signal, and a bitstream to which a time domain residual signal of the input signal is transformed after quantized, and the outputting of the time domain residual signal comprises restoring the time domain residual signal by dequantizing the bitstream.

3. The audio decoding method of claim 2, wherein the outputting of the frequency domain residual signal comprises outputting the frequency domain residual signal in which time axis envelope information is restored by LPC synthesis of the time domain residual signal using the LPC included in the received signal.

4. The audio decoding method of claim 2, wherein the outputting of the frequency domain signal comprises obtaining frequency axis envelope information from LPC frequency information included in the received signal, and outputting the frequency domain signal by restoring the frequency axis envelope information in the frequency domain residual signal.

5. An audio decoding method comprising:

outputting a time domain residual signal by dequantizing a received signal;

outputting a time domain signal by temporal noise shaping (TNS)-2 decoding of the time domain residual signal;

outputting a frequency domain residual signal by time-to-frequency (T/F) transform of the time domain signal;

outputting a frequency domain signal by performing frequency domain noise shaping (FDNS) decoding on the frequency domain residual signal;

outputting a second time domain signal by frequency-to-time (F/T) transform of the frequency domain signal; and restoring an input signal by performing time domain aliasing cancellation (TDAC) on the second time domain signal.

6. The audio decoding method of claim 5, wherein the received signal comprises at least one of linear prediction coefficient (LPC) information extracted from an input signal input to an audio encoding apparatus, a complex LPC obtained from a time domain signal of the input signal, and a bitstream to which a time domain residual signal of the input signal is transformed after quantized, and the outputting of the time domain residual signal comprises restoring the time domain residual signal by dequantizing the bitstream.

7. The audio decoding method of claim 6, wherein the outputting of the time domain signal comprises:

obtaining time axis envelope information by applying inverse discrete Fourier transform (IDFT) and an absolute value (ABS) operation to the complex LPC; and outputting the time domain signal by restoring the time axis envelope information in the time domain residual signal.

8. The audio decoding method of claim 6, wherein the outputting of the time domain signal comprises:

outputting a second frequency domain residual signal by performing DFT on the time domain residual signal;

restoring time axis envelope information by LPC analysis of the second frequency domain residual signal using the complex LPC; and obtaining the time domain signal by applying IDFT to the second frequency domain residual signal in which the time axis envelope information is restored.

9. An audio decoding method comprising:

outputting a time domain residual signal by dequantizing a received signal;

outputting a time domain signal by temporal noise shaping (TNS)-2 decoding of the time domain residual signal; and restoring an input signal by synthesizing the time domain signal with linear prediction coefficient (LPC) information received from an audio encoding apparatus.

10. The audio decoding method of claim 9, wherein the received signal comprises at least one of LPC information extracted from an input signal input to an audio encoding apparatus, a complex LPC obtained from a time domain signal of the input signal, and a bitstream to which a time domain residual signal of the input signal is transformed after quantized, and the outputting of the time domain residual signal comprises restoring the time domain residual signal by dequantizing the bitstream.

11. The audio decoding method of claim 10, wherein the outputting of the time domain signal comprises:

obtaining time axis envelope information by applying inverse discrete Fourier transform (IDFT) and an absolute value (ABS) operation to the complex LPC; and outputting the time domain signal by restoring the time axis envelope information in the time domain residual signal.

* * * * *